United States Patent
Clawson

(10) Patent No.: US 9,877,171 B2
(45) Date of Patent: *Jan. 23, 2018

(54) PICTURE/VIDEO MESSAGING PROTOCOL FOR EMERGENCY RESPONSE

(71) Applicant: Jeffrey J. Clawson, Salt Lake City, UT (US)

(72) Inventor: Jeffrey J. Clawson, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,424

(22) Filed: Apr. 8, 2016

(65) Prior Publication Data

US 2017/0295477 A1 Oct. 12, 2017

(51) Int. Cl.
*H04M 3/51* (2006.01)
*H04W 4/14* (2009.01)
*H04W 4/22* (2009.01)

(52) U.S. Cl.
CPC ........... *H04W 4/14* (2013.01); *H04M 3/5116* (2013.01); *H04W 4/22* (2013.01); *H04M 2242/04* (2013.01)

(58) Field of Classification Search
CPC .............................. H04W 4/14; H04M 3/5116
See application file for complete search history.

(56) References Cited

U.S. PATENT DOCUMENTS

| | | |
|---|---|---|
| 3,799,147 A | 3/1974 | Adolph et al. |
| 4,130,881 A | 12/1978 | Haessler et al. |
| 4,164,320 A | 8/1979 | Irazoqui et al. |
| 4,237,344 A | 12/1980 | Moore |
| 4,290,114 A | 9/1981 | Sinay |

(Continued)

FOREIGN PATENT DOCUMENTS

| | | |
|---|---|---|
| CN | 1674685 A | 9/2005 |
| CN | 101169840 A | 4/2008 |

(Continued)

OTHER PUBLICATIONS

Office Action Summary from USPTO for U.S. Appl. No. 10/140,635 dated Jul. 16, 2004, 11 pgs.

(Continued)

*Primary Examiner* — Christopher M Brandt
(74) *Attorney, Agent, or Firm* — Stoel Rives LLP

(57) ABSTRACT

Systems and methods are provided to guide an emergency dispatcher in responding to emergency communications. The systems and methods may allow the dispatcher to use one or more of a plurality of different communication methods to communicate with a person needing assistance, such as by sending graphical multimedia messages with instructions for treatment. The systems and methods can include an emergency police, emergency fire, and/or emergency medical dispatch protocol configured to facilitate rapid, uniform, and consistent handling of communications. The emergency dispatch protocol presents a pre-scripted interrogation, including preprogrammed inquiries for a dispatcher to ask the person needing assistance. The dispatch protocol may facilitate quick deployment of responders. The emergency dispatcher may be able to manually or automatically send pre-dispatch or post-dispatch instructions in pictorial or video format to the person needing assistance for more effective guidance and/or instruction of treatment methods.

29 Claims, 11 Drawing Sheets

(56) References Cited

U.S. PATENT DOCUMENTS

| | | | |
|---|---|---|---|
| 4,338,493 A | 7/1982 | Stenhuis et al. |
| 4,360,345 A | 11/1982 | Hon |
| 4,455,548 A | 6/1984 | Burnett |
| 4,489,387 A | 12/1984 | Lamb et al. |
| 4,731,725 A | 3/1988 | Suto et al. |
| 4,839,822 A | 6/1989 | Dormond et al. |
| 4,858,121 A | 8/1989 | Barber et al. |
| 4,865,549 A | 9/1989 | Sonsteby |
| 4,922,514 A | 5/1990 | Bergeron et al. |
| 4,926,495 A | 5/1990 | Comroe et al. |
| 4,945,476 A | 7/1990 | Bodick et al. |
| 4,967,754 A | 11/1990 | Rossi |
| 5,063,522 A | 11/1991 | Winters |
| 5,065,315 A | 11/1991 | Garcia |
| 5,072,383 A | 12/1991 | Brimm et al. |
| 5,077,666 A | 12/1991 | Brimm et al. |
| 5,086,391 A | 2/1992 | Chambers |
| 5,109,399 A | 4/1992 | Thompson |
| 5,122,959 A | 6/1992 | Nathanson et al. |
| 5,193,855 A | 3/1993 | Shamos |
| 5,228,449 A | 7/1993 | Christ et al. |
| 5,253,164 A | 10/1993 | Holloway et al. |
| 5,255,187 A | 10/1993 | Sorensen |
| 5,291,399 A | 3/1994 | Chaco |
| 5,323,444 A | 6/1994 | Ertz et al. |
| 5,339,351 A | 8/1994 | Hoskinson et al. |
| 5,348,008 A | 9/1994 | Bornn et al. |
| 5,379,337 A | 1/1995 | Castillo et al. |
| 5,404,292 A | 4/1995 | Hendrickson |
| 5,410,471 A | 4/1995 | Alyfuku et al. |
| 5,423,061 A | 6/1995 | Fumarolo et al. |
| 5,438,996 A | 8/1995 | Kemper et al. |
| 5,441,047 A | 8/1995 | David et al. |
| 5,462,051 A | 10/1995 | Oka et al. |
| 5,471,382 A | 11/1995 | Tallman et al. |
| 5,502,726 A | 3/1996 | Fischer |
| 5,513,993 A | 5/1996 | Lindley et al. |
| 5,516,702 A | 5/1996 | Senyei et al. |
| 5,521,812 A | 5/1996 | Feder et al. |
| 5,536,084 A | 7/1996 | Curtis et al. |
| 5,544,649 A | 8/1996 | David et al. |
| 5,554,031 A | 9/1996 | Moir et al. |
| 5,590,269 A | 12/1996 | Kruse et al. |
| 5,593,426 A * | 1/1997 | Morgan .................. A61N 1/39 128/903 |
| 5,594,638 A | 1/1997 | Iliff |
| 5,594,786 A | 1/1997 | Chaco et al. |
| 5,596,994 A | 1/1997 | Bro |
| 5,630,125 A | 5/1997 | Zellweger |
| 5,636,873 A | 6/1997 | Sonsteby |
| 5,650,995 A | 7/1997 | Kent |
| 5,660,176 A | 8/1997 | Iliff |
| 5,675,372 A | 10/1997 | Aguayo, Jr. et al. |
| 5,682,419 A | 10/1997 | Grube et al. |
| 5,684,860 A | 11/1997 | Milani et al. |
| 5,689,229 A | 11/1997 | Chaco et al. |
| 5,719,918 A | 2/1998 | Serbetciouglu et al. |
| 5,722,418 A | 3/1998 | Bro |
| 5,724,983 A | 3/1998 | Selker et al. |
| 5,734,706 A | 3/1998 | Windsor et al. |
| 5,745,532 A | 4/1998 | Campana, Jr. |
| 5,748,907 A | 5/1998 | Crane |
| 5,754,960 A | 5/1998 | Downs et al. |
| 5,759,044 A | 6/1998 | Redmond |
| 5,761,278 A | 6/1998 | Pickett et al. |
| 5,761,493 A | 6/1998 | Blakeley et al. |
| 5,764,923 A | 6/1998 | Tallman et al. |
| 5,787,429 A | 7/1998 | Nikolin, Jr. |
| 5,805,670 A | 9/1998 | Pons et al. |
| 5,809,493 A | 9/1998 | Ahamed et al. |
| 5,822,544 A | 10/1998 | Chaco et al. |
| 5,823,948 A | 10/1998 | Ross, Jr. et al. |
| 5,826,077 A | 10/1998 | Blakeley et al. |
| 5,832,187 A | 11/1998 | Pedersen et al. |
| 5,842,173 A | 11/1998 | Strum et al. |
| 5,844,817 A | 12/1998 | Lobley et al. |
| 5,850,611 A | 12/1998 | Krebs |
| 5,857,966 A | 1/1999 | Clawson |
| 5,901,214 A | 5/1999 | Shaffer et al. |
| 5,902,234 A | 5/1999 | Webb |
| 5,910,987 A | 6/1999 | Ginter et al. |
| 5,912,818 A | 6/1999 | McGrady et al. |
| 5,915,019 A | 6/1999 | Ginter et al. |
| 5,926,526 A | 7/1999 | Rapaport et al. |
| 5,933,780 A | 8/1999 | Connor et al. |
| 5,961,446 A | 10/1999 | Beller et al. |
| 5,962,891 A | 10/1999 | Arai |
| 5,964,700 A | 10/1999 | Tallman et al. |
| 5,986,543 A | 11/1999 | Johnson |
| 5,989,187 A | 11/1999 | Clawson |
| 5,991,730 A | 11/1999 | Lubin et al. |
| 5,991,751 A | 11/1999 | Rivette et al. |
| 6,004,266 A | 12/1999 | Clawson |
| 6,010,451 A | 1/2000 | Clawson |
| 6,022,315 A | 2/2000 | Iliff |
| 6,035,187 A | 3/2000 | Franza |
| 6,040,770 A | 3/2000 | Britton |
| 6,052,574 A | 4/2000 | Smith, Jr. |
| 6,053,864 A | 4/2000 | Clawson |
| 6,058,179 A | 5/2000 | Shaffer et al. |
| 6,074,345 A | 6/2000 | van Oostrom et al. |
| 6,076,065 A | 6/2000 | Clawson |
| 6,078,894 A | 6/2000 | Clawson et al. |
| 6,084,510 A | 7/2000 | Lemelson et al. |
| 6,106,459 A | 8/2000 | Clawson |
| 6,112,083 A | 8/2000 | Sweet et al. |
| 6,115,646 A | 9/2000 | Fiszman et al. |
| 6,117,073 A | 9/2000 | Jones et al. |
| 6,118,866 A | 9/2000 | Shtivelman |
| 6,127,975 A | 10/2000 | Maloney |
| 6,134,105 A | 10/2000 | Lueker |
| 6,292,542 B1 | 9/2001 | Bilder |
| 6,370,234 B1 | 4/2002 | Kroll |
| 6,535,121 B2 | 3/2003 | Matheny |
| 6,594,634 B1 | 7/2003 | Hampton et al. |
| 6,607,481 B1 | 8/2003 | Clawson |
| 6,610,012 B2 | 8/2003 | Mault |
| 6,696,956 B1 | 2/2004 | Uchida et al. |
| 6,710,711 B2 | 3/2004 | Berry |
| 6,879,819 B2 | 4/2005 | Brooks |
| 6,901,397 B1 | 5/2005 | Moldenhauer et al. |
| 6,931,112 B1 | 8/2005 | McFarland et al. |
| 6,968,375 B1 | 11/2005 | Brown |
| 7,106,835 B2 | 9/2006 | Saalsaa |
| 7,194,395 B2 | 3/2007 | Genovese |
| 7,289,944 B1 | 10/2007 | Genovese |
| 7,428,301 B1 | 9/2008 | Clawson |
| 7,436,937 B2 | 10/2008 | Clawson |
| 7,438,301 B2 | 10/2008 | Schilling et al. |
| 7,645,234 B2 | 1/2010 | Clawson |
| 7,703,020 B2 | 4/2010 | Bhattaru |
| 7,783,586 B2 | 8/2010 | Friedlander et al. |
| 7,978,826 B2 | 7/2011 | Salafia et al. |
| 8,066,638 B2 | 11/2011 | Clawson |
| 8,081,951 B1 | 12/2011 | Blum |
| 8,103,523 B2 | 1/2012 | Clawson |
| 8,294,570 B2 | 10/2012 | Clawson |
| 8,335,298 B2 | 12/2012 | Clawson |
| 8,346,942 B2 | 1/2013 | Ezerzer et al. |
| 8,355,483 B2 | 1/2013 | Clawson |
| 8,396,191 B2 | 3/2013 | Clawson |
| 8,417,533 B2 | 4/2013 | Clawson |
| 8,462,914 B2 | 6/2013 | Ragno et al. |
| 8,488,748 B2 | 7/2013 | Clawson |
| 8,494,868 B2 | 7/2013 | Saalsaa |
| 8,538,374 B1 | 9/2013 | Haimo et al. |
| 8,670,526 B2 | 3/2014 | Clawson |
| 8,712,020 B2 | 4/2014 | Clawson |
| 8,873,719 B2 | 10/2014 | Clawson |
| 8,971,501 B2 | 3/2015 | Clawson et al. |
| 9,319,859 B2 | 4/2016 | Clawson |
| 2002/0004729 A1 | 1/2002 | Zak et al. |
| 2002/0106059 A1 | 8/2002 | Kroll et al. |
| 2003/0028536 A1 | 2/2003 | Singh et al. |

(56) References Cited

U.S. PATENT DOCUMENTS

| | | |
|---|---|---|
| 2003/0050538 A1 | 3/2003 | Naghavi et al. |
| 2003/0187615 A1 | 10/2003 | Epler |
| 2003/0195394 A1 | 10/2003 | Saalsaa |
| 2003/0211856 A1 | 11/2003 | Zilliacus |
| 2003/0212575 A1 | 11/2003 | Saalsaa et al. |
| 2005/0015115 A1 | 1/2005 | Sullivan et al. |
| 2005/0065813 A1 | 3/2005 | Mishelevich et al. |
| 2006/0059423 A1 | 3/2006 | Lehmann et al. |
| 2006/0122520 A1 | 6/2006 | Banet et al. |
| 2006/0152372 A1 | 7/2006 | Stout |
| 2006/0167346 A1 | 7/2006 | Sarel |
| 2006/0173500 A1 | 8/2006 | Walker et al. |
| 2006/0178908 A1 | 8/2006 | Rappaport |
| 2006/0212315 A1 | 9/2006 | Wiggins |
| 2006/0225213 A1 | 10/2006 | Tomcany |
| 2007/0055559 A1 | 3/2007 | Clawson |
| 2007/0112275 A1 | 5/2007 | Cooke et al. |
| 2007/0116189 A1 | 5/2007 | Clawson |
| 2007/0189480 A1 | 8/2007 | Salafia et al. |
| 2007/0201664 A1 | 8/2007 | Salafia et al. |
| 2008/0208801 A1 | 8/2008 | Friedlander et al. |
| 2008/0310600 A1 | 12/2008 | Clawson |
| 2009/0037374 A1 | 2/2009 | Delia et al. |
| 2009/0168975 A1 | 7/2009 | Clawson |
| 2009/0191529 A1 | 7/2009 | Mozingo et al. |
| 2009/0233631 A1 | 9/2009 | Butler, Sr. et al. |
| 2009/0276489 A1 | 11/2009 | Ragno et al. |
| 2010/0004710 A1 | 1/2010 | Kellum |
| 2010/0121156 A1 | 5/2010 | Yoo |
| 2010/0152800 A1 | 6/2010 | Walker et al. |
| 2010/0198755 A1 | 8/2010 | Soll et al. |
| 2010/0257250 A1 | 10/2010 | Salafia et al. |
| 2011/0050417 A1 | 3/2011 | Piccioni |
| 2011/0064204 A1* | 3/2011 | Clawson ............... H04M 11/04 379/45 |
| 2011/0066002 A1 | 3/2011 | Clawson |
| 2011/0099031 A1 | 4/2011 | Nair |
| 2011/0205052 A1 | 8/2011 | Clawson |
| 2011/0215930 A1 | 9/2011 | Lee |
| 2012/0034897 A1 | 2/2012 | Kreitzer et al. |
| 2012/0066345 A1* | 3/2012 | Rayan ............... H04M 3/42008 709/218 |
| 2012/0171989 A1 | 7/2012 | Matsuo et al. |
| 2012/0183128 A1 | 7/2012 | Clawson |
| 2012/0207286 A1 | 8/2012 | Clawson |
| 2012/0210271 A1 | 8/2012 | Clawson |
| 2013/0100268 A1 | 4/2013 | Mihailidis et al. |
| 2014/0031885 A1* | 1/2014 | Elghazzawi ....... A61N 1/37282 607/5 |
| 2014/0211927 A1 | 7/2014 | Clawson |
| 2014/0243749 A1* | 8/2014 | Edwards ............... A61M 5/31 604/187 |
| 2015/0289121 A1* | 10/2015 | Lesage ............... G08B 25/006 455/404.1 |
| 2016/0088455 A1 | 3/2016 | Bozik et al. |
| 2016/0148490 A1* | 5/2016 | Barnes ............... G08B 25/016 455/404.1 |

FOREIGN PATENT DOCUMENTS

| | | |
|---|---|---|
| CN | 201117055 Y | 9/2008 |
| CN | 102714524 A | 10/2012 |
| EP | 2476092 A1 | 3/2011 |
| GB | 2471960 | 1/2011 |
| GB | 2478171 A | 8/2011 |
| GB | 2482741 A | 2/2012 |
| GB | 2489875 A | 10/2012 |
| JP | 2002-049693 | 2/2002 |
| JP | 2003-109162 A | 4/2003 |
| JP | 2003-187003 A | 7/2003 |
| JP | 2003-256963 A | 12/2003 |
| JP | 2010-033201 A | 12/2010 |
| KR | 10-2005-0085778 | 8/2005 |
| KR | 10-2006-0084866 | 7/2006 |
| KR | 2007-0043337 A | 4/2007 |
| KR | 10-2008-0004125 | 1/2008 |
| KR | 10-2009-0014837 A | 2/2009 |
| WO | WO2004/030259 | 4/2004 |
| WO | WO 2005/039406 A1 | 5/2005 |
| WO | WO2006/015229 A2 | 2/2006 |
| WO | WO 2008/014398 A2 | 1/2008 |
| WO | WO2008/156876 A1 | 12/2008 |
| WO | WO2011/031383 | 3/2011 |
| WO | WO2012/108898 A1 | 8/2012 |

OTHER PUBLICATIONS

Office Action Summary from USPTO for U.S. Appl. No. 10/140,635 dated Apr. 19, 2005, 11 pgs.
Office Action Summary from USPTO for U.S. Appl. No. 10/140,635 dated Jan. 17, 2006, 13 pgs.
Office Action Summary from USPTO for U.S. Appl. No. 10/140,635 dated Sep. 20, 2006, 15 pgs.
Office Action Summary from USPTO for U.S. Appl. No. 10/140,635 dated Jun. 21, 2007, 15 pgs.
International Search Report for PCT/US2008/054987 filed on Feb. 26, 2008, and dated Oct. 8, 2008, 2 pgs.
Written Opinion of the International Searching Authority for PCT/US2008/054987 filed on Feb. 26, 2008, and dated Oct. 8, 2008, 9 pgs.
Notification of Transmittal of the International Search Report (2 pgs.) for PCT/US2009/040909, International Search Report, (2 pgs.), and Written Opinion (8 pgs.) mailed from International Searching Authority dated Jun. 10, 2009.
International Search Report and Written Opinion for PCT/US09/48577, International filed Jun. 25, 2009, mailed from ISA dated Aug. 7, 2009, 9 pgs.
International Search Report and Written Opinion dated Jan. 19, 2011 in PCT Application No. PCT/US2010/043308, filed Jul. 27, 2010.
International Search Report and Written Opinion dated Jan. 19, 2011 in PCT Application No. PCT/US2010/043311, filed Jul. 27, 2010.
Office Action Summary from USPTO for U.S. Appl. No. 12/396,201 dated Mar. 8, 2011, 23 pgs.
International Search Report and Written Opinion PCT/US2010/050402, filed on Sep. 27, 2010, and mailed from ISA dated Apr. 27, 2011, 9 pgs.
Office Action Summary from USPTO for U.S. Appl. No. 12/268,963 dated Jul. 29, 2011, 18 pgs.
International Preliminary Report of Patentability for PCT/US2009/048577 filed on Jun. 25, 2009 dated Oct. 27, 2011, 7 pgs.
International Search Report and Written Opinion for PCT/US2011/042543 filed on Jun. 30, 2011, mailed from ISA dated Feb. 9, 2012, 11 pgs.
International Search Report and Written Opinion for PCT/US2011/042582 filed on Jun. 30, 2011, mailed from ISA dated Feb. 9, 2012, 8 pgs.
International Preliminary Report of Patentability for PCT/US2010/043308 filed on Jul. 27, 2010 dated Mar. 22, 2012, 6 pgs.
International Preliminary Report of Patentability for PCT/US2010/043311 filed on Jul. 27, 2010 dated Mar. 29, 2012, 6 pgs.
Office Action Summary from USPTO for U.S. Appl. No. 12/558,045 dated Mar. 22, 2012, 9 pgs.
Office Action Summary from USPTO for U.S. Appl. No. 12/558,808 dated Apr. 23, 2012, 9 pgs.
Office Action Summary from USPTO for U.S. Appl. No. 12/422,561 dated Jul. 3, 2012, 21 pgs.
International Search Report and Written Opinion for PCT/US2012/021867 filed on Jan. 19, 2012, and mailed from ISA dated Aug. 30, 2012, 8 pgs.
Office Action Summary from USPTO for U.S. Appl. No. 13/354,116 dated Jan. 22, 2013, 9 pgs.
Office Action Summary from USPTO for U.S. Appl. No. 12/422,561 dated Feb. 1, 2013, 26 pgs.
Notice of Allowance from USPTO for U.S. Appl. No. 13/026,055 dated Jan. 24, 2013.

(56) References Cited

OTHER PUBLICATIONS

Notice of Allowance from USPTO for U.S. Appl. No. 10/255,901 dated Feb. 20, 2013.
Nordberg, Marie, "Dispatch Disasters," Emergency Medicine, Aug. 1995.
Notice of Allowance from USPTO for U.S. Appl. No. 13/354,116 dated Jun. 7, 2013.
Liferidge, Aisha T., et al., "Ability of Laypersons to Use the Cincinnati Prehospital Stroke Scale", Prehospital Emergency Care, Elsevier, vol. 8, No. 4, Oct. 1, 2004, pp. 384-387.
Office Action Summary from USPTO for U.S. Appl. No. 13/026,043 dated Oct. 10, 2013.
International Preliminary Report of Patentability for PCT/US2011/042543 filed on Jun. 30, 2011 dated Aug. 22, 2013, 7 pgs.
International Preliminary Report of Patentability for PCT/US2011/042582 filed on Jun. 30, 2011 dated Aug. 22, 2013, 5 pgs.
Office Action Summary from USPTO for U.S. Appl. No. 13/605,501 dated Nov. 18, 2013.
International Search Report and Written Opinion for PCT/US2013/055537 filed on Aug. 19, 2013 and mailed from ISA dated Nov. 22, 2013.
Notice of Allowance from USPTO for U.S. Appl. No. 13/026,043 dated Jan. 13, 2014.
Nor, A. Mohd, et al., "Agreement Between Ambulance Paramedic—and Physician-Recorded Neurological Signs With Face Arm Speech Test (FAST) in Acute Stroke Patients", http://stroke.ahajournals.org/content/35/6/1355, Apr. 29, 2004, visited Nov. 17, 2013, 3 pgs.
Clark University "Active Shooter Emergency Plan" Revised Jan. 11, 2013.
Notice of Allowance from USPTO for U.S. Appl. No. 13/605,501 dated Mar. 6, 2014.
International Search Report and Written Opinion for PCT/US2014/011405 filed on Jan. 14, 2014 and mailed from ISA dated Apr. 25, 2014.
International Search Report and Written Opinion for PCT/US2014/014029 filed on Jan. 31, 2014 and mailed from ISA dated May 16, 2014.
Office Action Summary from USPTO for U.S. Appl. No. 13/755,793 dated Jul. 21, 2014.
International Preliminary Report of Patentability for PCT/US2013/055537 filed on Aug. 19, 2013 dated Mar. 19, 2015.
Notice of Allowance from USPTO for U.S. Appl. No. 12/422,561 dated Dec. 9, 2014.
Notice of Allowance from USPTO for U.S. Appl. No. 13/755,793 dated Sep. 22, 2014.
Non-Final Office Action for U.S. Appl. No. 14/169,302 filed Jan. 31, 2014, and mailed from the USPTO dated Sep. 25, 2015, 46 pgs.
Notice of Allowance and Fee(s) Due for U.S. Appl. No. 14/169,302 filed Jan. 31, 2014, and mailed from the USPTO dated Mar. 4, 2016, 13 pgs.
Non-Final Office Action for U.S. Appl. No. 14/723,947 filed May 28, 2016, and mailed from the USPTO dated Mar. 31, 2016, 33 pgs.
Non-Final Office Action for U.S. Appl. No. 15/083,810 filed Mar. 29, 2016, and mailed from the USPTO dated Jul. 15, 2016, 28 pgs.
Notice of Allowance and Fee(s) Due for U.S. Appl. No. 15/083,810 filed Mar. 29, 2016, and mailed from the USPTO dated Sep. 23, 2016, 14 pgs.
Notice of Allowance and Fee(s) Due for U.S. Appl. No. 14/723,947 filed May 28, 2015, and mailed from the USPTO dated Oct. 24, 2016, 29 pgs.
Peck, "Got a Minute?You Could Diagnose a Stroke," *WebMD Health News*, http://www.webmd.com/stroke/news/20030213/got-minute-you-could-diagnosie-stroke, Feb. 13, 2003, 3 pgs.
Radosevich, Lynda, "Network holds sway on life, death," Computerworld, v27 n21, May 24, 1993, 2 pgs.
Harris, Roger, "Updated 911 Phone System Top Concern of Residents," Business First-Louisville, v9 n19 s1, Dec. 1992, 3 pgs.
"Geac Completes Software Install," Wireless Week, Nov. 18, 1996, 3 pgs.
"Dictaphone introduces Windows-based Computer-Aided Dispatch (CAD) system," Business Wire, Apr. 23, 1996, 2 pgs. (in commercial use in 1995).
Holroyd, Brian, et al., "Medical Control; Quality Assurance in Prehospital Care," JAMA, the Journal of American Medical Association, v256, n8, Aug. 1986, p. 1027-1031.
CBS web page News Story entitled "911 Operator: 'It's got to be Hell'", Mar. 31, 2006 (excerpts from 911 operators' actions during the attacks on Sep. 11, 2001), 3 pgs.
Best, Wendy, "999 United Emergency services share life-saving Role to boost response," Western Daily Press, WDP Severnside ed., May 27, 1999, 2 pgs.
Poellmitz, William C., "Wireless technology keeps public safety a step ahead," Nation's Cities Weekly, v21 n17, Apr. 27, 1998, 3 pgs.
Crowley, Mark, "Learning from CAD System Implementation," Communications, v29 n8, Aug. 1992, 5 pgs.
Anonymous, "Suburban Chicago towns centralize 911 services," Communications News, v31 n10, Oct. 1994, 2 pgs.
Office Action Summary from USPTO for U.S. Appl. No. 10/255,901 dated Dec. 31, 2003, 8 pgs.
Office Action Summary from USPTO for U.S. Appl. No. 10/255,901 dated Oct. 13, 2004, 8 pgs.
Office Action Summary from USPTO for U.S. Appl. No. 10/255,901 dated Jun. 29, 2005, 7 pgs.
Advisory Action Before the Filing of an Appeal Brief from USPTO for U.S. Appl. No. 10/255,901 dated Feb. 14, 2006, 3 pgs.
Office Action Summary from USPTO for U.S. Appl. No. 10/255,901 dated Jun. 7, 2006, 8 pgs.
Office Action Summary from USPTO for U.S. Appl. No. 10/255,901 dated Feb. 27, 2007, 8 pgs.
Office Action Summary from USPTO for U.S. Appl. No. 10/255,901 dated Sep. 6, 2007, 9 pgs.
Office Action Summary from USPTO for U.S. Appl. No. 10/255,905 dated May 19, 2004, 7 pgs.
Office Action Summary from USPTO for U.S. Appl. No. 10/255,905 dated May 26, 2005, 5 pgs.
Office Action Summary from USPTO for U.S. Appl. No. 10/255,905 dated Feb. 9, 2006, 8 pgs.
Advisory Action Before the Filing of an Appeal Brief from USPTO for U.S. Appl. No. 10/255,905 dated Aug. 11, 2006, 3 pgs.
Office Action Summary from USPTO for U.S. Appl. No. 10/255,905 dated Jan. 30, 2007, 7 pgs.
Notice of Non-Compliant Amendment (37 CFR 1.121) from USPTO for U.S. Appl. No. 10/255,905 dated Jul. 9, 2007, 4 pgs.
Office Action Summary from USPTO for U.S. Appl. No. 10/255,905 dated Oct. 5, 2007, 7 pgs.
Office Action Summary from USPTO for U.S. Appl. No. 09/685,697 dated Jul. 18, 2003, 8 pgs.
Office Action Summary from USPTO for U.S. Appl. No. 09/685,697 dated Feb. 3, 2004, 5 pgs.
Office Action Summary from USPTO for U.S. Appl. No. 09/685,697 dated Jan. 4, 2005, 5 pgs.
Office Action Summary from USPTO for U.S. Appl. No. 09/685,697 dated Oct. 4, 2005, 7 pgs.
Advisory Action Before the Filing of an Appeal Brief from USPTO for U.S. Appl. No. 09/685,697 dated Mar. 13, 2006, 4 pgs.
Office Action Summary from USPTO for U.S. Appl. No. 09/685,697 dated Jun. 26, 2006, 8 pgs.
Office Action Summary from USPTO for U.S. Appl. No. 09/685,697 dated Apr. 10, 2007, 9 pgs.
Office Action Summary from USPTO for U.S. Appl. No. 09/685,697 dated Oct. 9, 2007, 11 pgs.
Office Action Summary from USPTO for U.S. Appl. No. 10/140,635 dated Oct. 3, 2003, 9 pgs.
International Search Report and Written Opinion for International Application No. PCT/US2017/021519 filed Mar. 9, 2017, and mailed from the International Search Authority dated May 22, 2017, 17 pgs. (23517/3601 PCT).

* cited by examiner

PICTURE/VIDEO MESSAGING PROTOCOL FOR EMERGENCY RESPONSE

COPYRIGHT NOTICE

©2016 Priority Dispatch Corp. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d).

TECHNICAL FIELD

The present disclosure relates to computer systems and methods for providing emergency protocol interrogation, instruction, and dispatch. More specifically, the disclosure is directed to systems and methods for sending picture and/or video messages to and/or receiving picture and/or video messages from a person needing assistance while guiding a dispatcher during interrogation and instruction of the person needing assistance.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
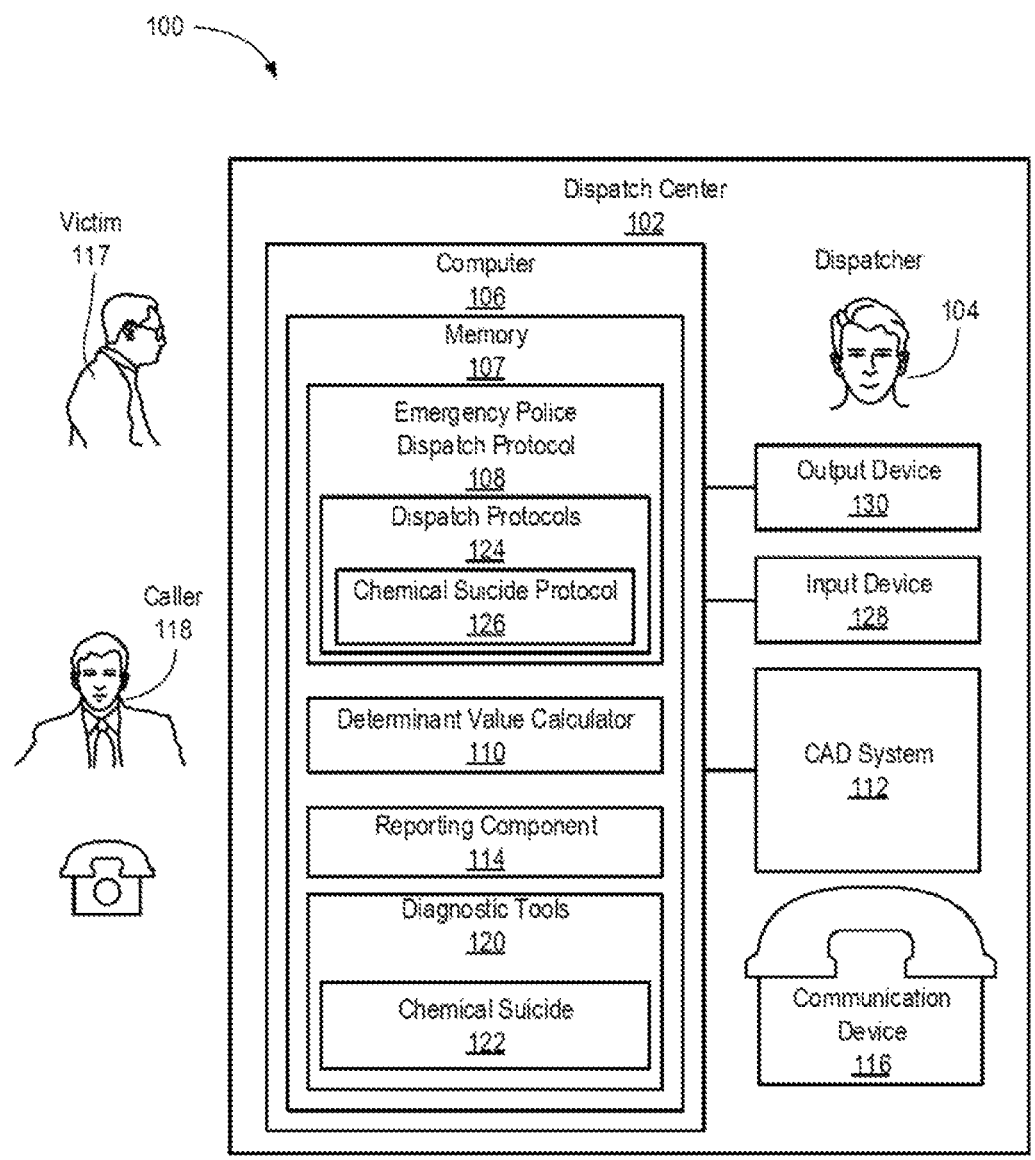
FIG. 1 is a block diagram of an emergency dispatch system, according to one embodiment.

Emergency dispatchers may serve a critical role as the first and/or only persons to interface with a person needing assistance (e.g., a person contacting or calling an emergency dispatch center). In their role of receiving emergency communication, emergency dispatchers are in a unique position and may potentially contribute to more positive outcomes by providing a person needing assistance with critical lifesaving instructions and by conducting a precise interrogation to gather specific information that will assist police officers in determining the appropriate response. Unfortunately, emergency dispatchers are often inexperienced and unskilled, largely due to a high turnover rate among emergency dispatchers.

An automated emergency dispatch system, potentially implemented on a computer, can aid even an unskilled and inexperienced dispatcher in prioritizing emergency communications (e.g., emergency calls, emergency messages, etc.) that are received and in processing the communications to generate an appropriate emergency dispatch response. Regardless of the experience or skill level of the dispatcher, the automated emergency dispatch system can enable a consistent and predictable emergency dispatch response, despite the diverse aspects of emergency situations that may be reported from one communication to the next.

In some situations, a graphical multimedia message may be the only, safest, and/or most convenient way to communicate effectively with a person needing assistance. Oftentimes, a person needing assistance will make a call to an emergency response dispatcher on a mobile device, i.e., a cellular telephone, smartphone, or other similar portable electronic device. For example, a person needing assistance may have been in a car accident, come across someone who has overdosed on drugs, witnessed a person going into cardiac arrest, or been stung by a bee while on a hike. The person needing assistance may also be ignorant to the incident at hand and not have the knowledge necessary to administer first aid or other types of treatment to himself or herself or any other individual in need. A graphical multimedia message may be able to provide information that cannot be conveyed in a phone call and/or SMS message, such as a picture of a possible remedy with accompanying instructions and/or a video of how to administer a potential treatment. The person needing assistance may also be hearing-impaired and/or may not be able to talk due to a hostile assailant in the area, extreme background noise, a lack of oxygen (e.g., asthma or choking), or the like. Unfortunately, existing emergency dispatch centers may be poorly equipped to receive and/or send graphical multimedia messages. Additionally, even if a dispatch center is able to receive and/or send graphical multimedia messages, the messaging capability may not be integrated with automated emergency dispatch systems.

In many emergency situations, speed is of the essence. Delays of seconds or minutes may lead to a poorer outcome for a person needing assistance. Having to copy and/or transcribe every question and/or response between an automated emergency dispatch system and an SMS/MMS messaging system may result in such delays. An automated emergency dispatch system could save time and/or effect better outcomes by being able to send questions and/or receive responses automatically and/or with little operator effort.

Upon receiving answers to various inquiries, the automated emergency dispatch system may be configured to send graphical multimedia messages itself or may be communicatively coupled with a messaging system that can be instructed by the automated emergency dispatch system to send messages. To save time, the automated emergency dispatch system may transmit a graphical multimedia message in response to no more than zero, one, two, three, or four actions by the dispatcher. For example, once the dispatcher has ascertained what sort of help the person needing assistance requires, the dispatcher may be able to select a graphical multimedia message to transmit to the person needing assistance. Alternatively, or in addition, the actions may be single key strokes. The graphical multimedia message may be received on a portable electronic device, and in the case of video messages, may be playable on the portable electronic device for on-scene instruction to the person needing assistance.

The automated emergency dispatch system may log all graphical multimedia messages as well as SMS text messages sent and received by the system. For example, the automated emergency dispatch system may store a time stamp for each message and/or the contents (e.g., text, photo, video, etc.) of each message to a persistent storage device. The automated emergency dispatch system may ensure that messages are properly routed to and from people needing assistance. In some embodiments, the automated emergency dispatch system may be coupled to a computer network. The automated emergency dispatch system may then translate a telephone number for the person needing assistance to a computer network address and/or may determine the computer network address from a message (e.g., from the header of a message) received from the person needing assistance. The automated emergency dispatch system may automatically register its own computer network address with one or more telephone service providers so graphical multimedia messages to people needing assistance are sent from the appropriate emergency dispatch center to the appropriate portable electronic device.

Following inquiries to and upon receiving answers from the person needing assistance, the automated emergency dispatch system may also be configured to provide an image and/or video depicting a potential treatment for a particular incident. This may be done via a graphical multimedia message. The dispatcher may be prompted by the automated emergency dispatch system to transmit the image and/or video in a graphical multimedia message format such as MMS, simple mail transfer protocol (SMTP) or other format to the person needing assistance. Alternatively or in addition, the automated emergency dispatch system may automatically send the image and/or video in a graphical multimedia message format such as MMS or other format. The graphical multimedia message may then be received by the person needing assistance on his or her portable electronic device so as to provide instructions and/or information on potential treatments to a particular incident. Such instructions may include but are not limited to: a picture of a specific medication needed for treating drug overdose, an image of a bee sting remedy and how to apply it, or a picture and accompanying labels of an external defibrillator with usage instructions. The instructions may alternatively be in playable video format for the person needing assistance to, for example: view an instructional video on how to treat a bee sting, observe how a particular medication is prepared and administered, or receive instruction on how to operate an external defibrillator. Graphical instructions of this kind are beneficial in helping the person needing assistance understand what do to in a certain situation through clear, concise direction in times of distress when verbal communication may be less effective. Additionally, graphical multimedia messages may aid in preventing further harm to any injured persons involved in a particular incident as a result of misguided efforts by the person needing assistance had the he or she not received and/or understood any instructions in a timely manner.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory storage device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

An emergency dispatch system as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems. The memory may also store application programs including a Computer Aided Dispatch (CAD) program, an automated emergency dispatch protocol, and a user interface program. The memory may also include data storage. The computer may further include an output device, such as a display unit, for viewing the displayed instructions and inquiries and a user input device for inputting response data.

FIG. 1 is an emergency dispatch system 100, according to one embodiment. At a dispatch center 102, a dispatcher 104 may operate a computer 106 or other computing device. The computer 106 may include a memory 107 to store protocols, modules, tools, data, etc. The computer 106 may be configured to follow an emergency dispatch protocol 108 to enable the dispatcher 104 to rapidly and consistently address an emergency incident involving a crime or other emergency, or otherwise request law enforcement or other emergency responders, as reported by a person needing assistance/caller 118. An emergency communication requesting law enforcement or other emergency responders may report an incident that may involve a victim 117. As can be appreciated, in some circumstances and/or incidents, the person needing assistance 118 is the victim 117. In other instances the person needing assistance 118 may be a second party (e.g., a person with the victim 117), a third party (e.g., a person not in the immediate vicinity of the victim 117), a fourth party (e.g., a reporting or referral agency), or the suspect (or perpetrator). The emergency dispatch protocol 108 may include a logic tree, preprogrammed inquiries or questions, possible responses from the person needing assistance 118 to the inquiries, and instructions to the person needing assistance 118. The responses may route to subsequent preprogrammed inquiries and/or instructions to the person needing assistance 118. The emergency dispatch protocol 108 may also include dispatch protocols 124 for guiding the dispatcher 104 in processing emergency communications involving specific situations and/or incidents. The dispatch protocols 124 may similarly include a logic tree, preprogrammed inquiries or questions, possible responses from the person needing assistance 118 to the preprogrammed inquiries, and instructions for the person needing assistance 118. It should be understood the emergency dispatch protocol 108 may be embodied as or include specific protocols, such as an emergency police dispatch protocol, emergency fire dispatch protocol and/or an emergency medical dispatch protocol. Thus, the victim 117 may also be identified as a patient.

The responses of the person needing assistance 118 are processed according to predetermined logic of the logic tree of the emergency dispatch protocol 108. The predetermined logic may enable the emergency dispatch system 100 to provide to the dispatcher 104 information concerning the correct emergency dispatch response (e.g., by trained law enforcement officers or agencies and/or other emergency responders). The predetermined logic may also enable the emergency dispatch system 100 to provide to the dispatcher 104 appropriate post-dispatch instructions for relay to the person needing assistance 118 before professional help arrives at the scene. The predetermined logic may also enable the emergency dispatch system 100 to aid the dispatcher 104 in determining an appropriate priority of the emergency communication, including but not limited to a priority of the emergency communication relative to other emergency communications and a level of emergency response to provide for the reported incident or situation.

Although an emergency dispatch system 100 is disclosed and described herein, a person of ordinary skill can appreciate that other emergency dispatch systems and protocols are contemplated, including but not limited to emergency medical dispatch systems and protocols and emergency fire dispatch systems and protocols. Exemplary embodiments of emergency dispatch systems and protocols are disclosed in U.S. Pat. Nos. 5,857,966; 5,989,187; 6,004,266; 6,010,451; 6,053,864; 6,076,065; 6,078,894; 6,106,459; 6,607,481; 7,106,835; 7,428,301; 7,436,937; 7,645,234; 8,066,638; 8,103,523; 8,294,570; 8,335,298; and 8,355,483, which are hereby incorporated herein by reference.

The computer 106 operates a determinant value calculator 110 to calculate a determinant value from the responses of the person needing assistance 118 to protocol questions. The determinant value may be selected from a group of pre-established determinant values, such that the emergency responders are familiar with the determinant values and understand the meaning of each and what would be a corresponding emergency response. For example, the determinant values may range, for example, from E-1 for generally very serious emergencies to Ω-2 for generally less serious emergencies. The determinant value may provide a categorization code of the type and level of the incident.

In one embodiment of the present disclosure, the determinant value is a combination of a determinant level (Alpha A, Bravo B, Charlie C, Delta D, Echo E and Omega Ω) and a numeric value. Generally, Ω-2 is the least serious while E-1 is the most serious communication. Depending on the determinant level, the appropriate emergency response is dispatched as indicated by the response protocol. For example, an Alpha A communication will typically be responded to by a next available law enforcement unit using the safest arrival method reasonably possible. A Delta D communication will typically be responded to by any or all available law enforcement units proceeding under the most urgent method possible. Echo E communications typically involve likely immediate life-threatening situations and will be responded to in the most urgent manner available. Bravo B and Charlie C communications are intermediate emergencies that are typically responded to in business-like, orderly manner according to specific department protocol. An Omega Ω communication is generally not specifically responded to, but rather is referred to another person or agency. For the purposes of this disclosure, Echo E is generally abbreviated as E; Delta D is generally abbreviated as D; Charlie C is generally abbreviated as C; Bravo B is generally abbreviated as B; Alpha A is generally abbreviated as A; and Omega Ω is generally abbreviated as Ω. Generally, the lower determinant levels (e.g., numbers) within a determinant classification are more urgent than higher numbers. For example, an emergency dispatch communication with a determinant value of D-1 is generally more critical and requires a more urgent response than a communication with a determinant value of D-2. However, in some instances, the numeric determinant levels within a determinant value may serve only to identify the type, rather than criticality, of the communication. Also, if more than one determinant value can be assigned to a particular communication, the more critical or higher determinant value is assigned. That is, the communication is assigned a criticality determinant value based on the fact or aspect that would lead to the most urgent response. For example, if the communication concerns a burglary that occurred over 30 minutes before, but where the suspect remains on the scene or nearby and the person needing assistance indicates that he or she is still in danger and feels his or her life is in imminent danger, then the determinant value assigned would be E-1 (due to the imminent danger) rather than D-2 (suspect on scene or nearby) or B-1 (incident occurred over 30 minutes before).

Many communications for law enforcement are not true emergencies, so it is important to prioritize the communications in several ways. First, communications that are true emergencies should be dispatched first. Second, if an agency has units with different capabilities, the emergencies involving more severe problems can be sent units that are more skilled and advanced (e.g., a S.W.A.T. team or bomb squad). And finally, if lights and siren are not needed, they should not be used, thereby increasing the safety of all those on the road and in the emergency response vehicles. The computer 106 presents the determinant value to generate an appropriate emergency dispatch response and/or establish the priority of the emergency communication. The response may include dispatching professional law enforcement officers or other emergency responders to the scene of the emergency. The protocols used shall have passed through a rigorous review by a panel of experienced law enforcement agents and EMS public safety experts.

The determinant value may be provided to a Computer Aided Dispatch (CAD) system 112, which is a tool that the dispatcher 104 may use to track and allocate emergency response resources for processing emergency communications. The CAD system 112 may manage dispatcher tools for processing emergency communications, including but not limited to the emergency dispatch protocol 108, responder communication resources (e.g., radio system, alpha pager), mapping tools (e.g., global positioning system (GPS) technology, geographic information systems (GIS)), and vehicle location systems (e.g., automatic vehicle location (AVL)). The CAD system 112 may operate in whole or in part on a separate computer in communication with the computer 106. In another embodiment, the CAD system 112 operates on the computer 106. The primary information used by the CAD system 112 is location information of the incident and units, unit availability, and the type of incident. The CAD system 112 may use third party solutions, such as E-911, vehicle location transponders, and mobile data terminals (MDTs) for automating the location and availability tasks. The CAD system 112 may also use the emergency dispatch protocol 108 to facilitate structured communication for incident interrogation, as previously described.

Although many emergency communications are not true emergencies, all situations can benefit from expert evaluation and pertinent instruction. Prior to the arrival of professional help on-scene, the emergency dispatch protocol 108 may provide the dispatcher 104 with instructions for the person needing assistance 118 that are appropriate to the type of communication, whether the communication relates to a complaint of vandalism or to a homicide. These instructions may help expedite the work of law enforcement officers and/or other emergency responders.

The computer 106 may include a reporting component 114 to statistically measure the performance of individual staff and overall performance of the dispatch center 102. To record information received during a communication, the dispatcher 104 may be required to open a new case. Once the communication is complete, the dispatcher 104 may close the case, and a case summary may be saved. The case summary may be retrieved later for review and/or analysis. The reporting component 114 may determine statistics from the case summaries and/or do so while the cases are open. The statistics may include compliance rates, call/communication processing statistics, and peer measurements.

The computer 106 may further comprise an input device 128, such as a keyboard, mouse, touch screen, laser pointer, or other input device, and also an output device 130, such as a display monitor. The input device 128 receives input from a user (generally a dispatcher) and provides the input to the emergency dispatch system 100. The input may be provided to the computer 106, the emergency dispatch protocol 108, diagnostic tools 120, and/or the CAD system 112. The output device 130 receives output from the emergency dispatch system 100 and displays or otherwise provides the output to the user. In another embodiment, the input device 128 and output device 130 are provided by the CAD system 112.

The dispatch center 102 includes a communication device 116 (e.g., telephone equipment) to answer emergency communications. The communication device 116 may be configured to send and/or receive communications using one or more different methods and may include a telephone coupled to a public switch telephone network (PSTN) (e.g., a landline telephone); a telephone coupled to a computer network (e.g., a VoIP telephone); a telephone configured to communicate via radio waves (e.g., a mobile phone); a system, which may or may not include a telephone, configured to send and/or receive SMS and/or graphical multimedia messages such as MMS messages via a PSTN, a computer network, and/or radio waves; and/or the like. The communication device 116 may include multiple communication systems, such as a landline telephone and a system configured to send and receive graphical multimedia messages and SMS messages via a network. As can be appreciated, the particular methods of communication used may change as technology evolves. Some and/or all of the communication device may be implemented on the computer 106 (e.g., when communicating via a computer network). Alternatively, the communication device 116 may be coupled to the computer 106.

The communication device 116 may be configured to determine a computer network address (e.g., an internet protocol address, email address, etc.) corresponding to a telephone number of the person needing assistance 118. For example, the communication device 116 may determine a telephone service provider based on the telephone number and may construct the computer network address based on the phone service provider and the telephone number. Alternatively, or in addition, the communication device 116 may determine the computer network address based on a source address specified in a communication from the person needing assistance 118. The communication device 116 may register a computer network address of the communication device 116 so graphical multimedia and/or SMS text messages are properly routed by the telephone service providers. For example, the communication device 116 may inform the telephone service providers and/or a third party of one or more telephone numbers, telephone number ranges, telephone exchanges, and/or geographic areas that are serviced by the dispatch center 102 and the computer network address that should be used to contact the dispatch center 102.

A message interface component 122 may be a component of an automated emergency dispatch system. The message interface component 122 may enable the emergency dispatch protocol 108, determinant value calculator 110, reporting component 114, diagnostic tools 120, and/or dispatch protocols 124 to interact with the communication device 116. In some embodiments, the message interface component 122 may also be or instead be a component of the communication device 116 and/or may itself be able to send communications to and/or receive communications from the person needing assistance 118. The message interface component 122 may also be able to send graphical multimedia messages that include images and/or playable videos containing information relating to the emergency to further help the person needing assistance 118. For example, the person needing assistance 118 may be able to receive a playable video on his or her portable electronic device that contains instructions on how to operate an external defibrillator. The message interface component 122 may send the graphical multimedia messages automatically or in response to input by the dispatcher 104.

A communication received at the dispatch center 102 from the person needing assistance 118 may initiate creation of an emergency communication incident. The dispatcher 104 identifies the communication as requiring an emergency dispatch, and the emergency dispatch protocol 108 is accessed. The emergency dispatch protocol 108, including the dispatch protocols 124, may provide questions and/or instructions that are expertly drafted to assist the novice person needing assistance 118 in reporting aspects of the incident, and/or assessing a situation of the victim 117. The emergency dispatch protocol 108 may also provide expertly drafted instructions to assist the victim 117 prior to the arrival of trained law enforcement and/or emergency responders. The instructions may be vocally relayed and/or sent as one or more graphical multimedia messages by the dispatcher 104 to the person needing assistance 118 over the communication device 116.

Some protocol inquiries or questions may be readily answerable by the person needing assistance 118, whereas others may be more difficult to answer. Certain diagnostic inquiries may be difficult for the untrained person needing assistance to determine or may be difficult to answer under the stress of an emergency situation. Accordingly, in addition to instructions, the emergency dispatch system 100 may provide one or more computer-implemented diagnostic tools 120. The diagnostic tools 120 may greatly improve information collection and intervention for emergency response situations and aid in saving lives.

A diagnostic tool 120 may aid the dispatcher 104 and/or the person needing assistance 118 (via instructions from the dispatcher 104) in assessing a situation of the victim 117. A diagnostic tool 120 may also be an interventional tool, providing instructions that direct the person needing assistance 118 to intervene, or take action, to aid the victim 117, or otherwise change the circumstances or conditions of an emergency situation. For sake of clarity, diagnostic tools and interventional tools are both referred to herein generally as diagnostic tools. Accordingly, a diagnostic tool 120, as referred to herein, may provide diagnostic instructions, interventional instructions, or both diagnostic and interventional instructions. Whether a diagnostic tool 120 provides merely diagnostic instructions, merely interventional instructions, or both diagnostic and interventional instructions, the diagnostic tool 120 provides consistent and reliable instruction, information gathering, and/or timing for a particular emergency situation.

The diagnostic tools 120 are computer-implemented software modules that enable the dispatcher 104 to provide consistent, expert advice to assist the person needing assistance 118 with regard to a particular aspect of an emergency situation, such as determining a vital sign. One benefit of the diagnostic tools 120 is the computer-aided timing of techniques to determine the vital signs. In highly stressful conditions, the diagnostic tools 120 provide a necessary resource to reading critical signs. The diagnostic tools 120 may be stored in the memory of the computer 106 and initiated and executed as required. The diagnostic tools 120 may be embodied as computer-executable software applications and associated data.

The emergency dispatch protocol 108, including the dispatch protocols 124, also may call on one or more diagnostic tools 120 to assist with an inquiry and may route to the appropriate diagnostic tool 120 when needed. When directed according to the protocol, the emergency dispatch protocol 108 may automatically, i.e., without dispatcher intervention, initiate the appropriate diagnostic tool 120. This may occur when the emergency dispatch protocol 108 arrives at a diagnosis or assessment step in the logic tree. The emergency dispatch system 100 may also allow the dispatcher 104 the option to call upon a diagnostic tool 120 as desired. Icons may be displayed in a tool bar or other convenient location on a user interface to allow the dispatcher 104 to initiate the corresponding diagnostic tool 120.

Figure 2:
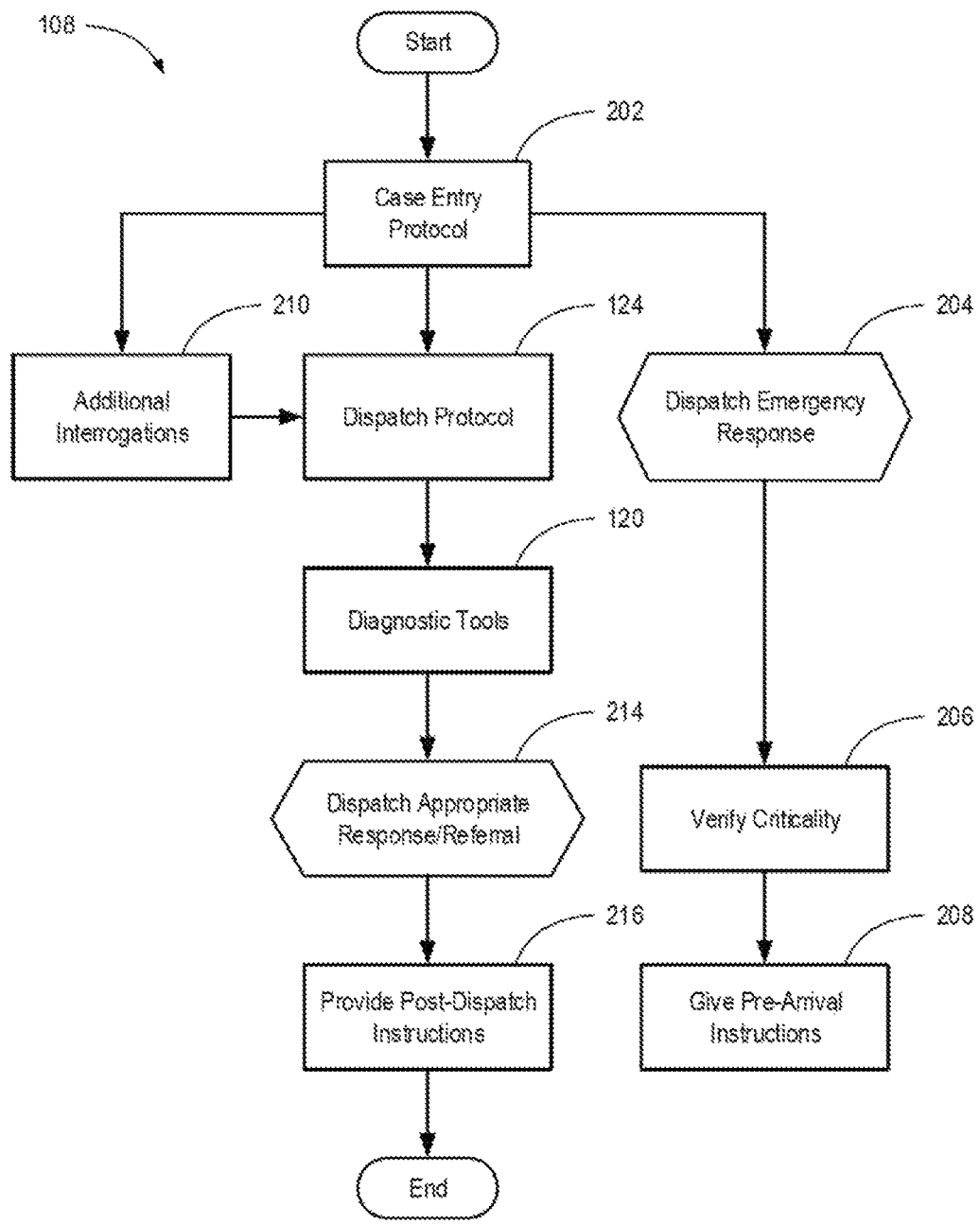
FIG. 2 is a flow diagram of an emergency dispatch protocol of an emergency police dispatch system, according to one embodiment.

FIG. 2 is a high-level flow diagram of an emergency dispatch protocol 108 of an emergency dispatch system, according to one embodiment. The protocol 108 may begin with a case entry protocol 202 that guides the dispatcher in gathering initial information. One aim of the case entry protocol 202 is to obtain sufficient information from the person needing assistance to permit identification of a chief complaint. Also, the case entry protocol 202 may be considered a primary interrogation because all communications may be processed through the case entry protocol 202 to gather initial incident information. The information received through the case entry protocol 202 may include a location of the incident, communication identifiers and/or addresses, such as a call-back number in the event a call is disconnected, the person needing assistance's name, and a description of the incident.

If the dispatcher receives and enters information that an incident is especially critical (e.g., an active assailant, a person needing assistance in imminent danger, a sinking vehicle, a vehicle in rising flood water, or a vehicle with a stuck accelerator that cannot stop), for whatever reason, an emergency response is dispatched 204 immediately, before continuing with any further interrogation or instructions. The dispatched 204 emergency response may be a maximum emergency response, including properly trained law enforcement officers. The criticality of the incident is verified 206 and pre-arrival instructions are given 208. The pre-arrival instructions can be tailored to the specific incident and/or situation. Typically, a result of properly conveyed (by the dispatcher) and executed (by the person needing assistance) pre-arrival instructions may be a more calm, stable situation at the time the law enforcement emergency responders arrive, and/or reduced risk of injury or death for the person needing assistance. The pre-arrival instructions may aid to ensure safety and improve the effectiveness of the dispatched 204 emergency response.

If the dispatcher receives information from the person needing assistance to confirm the incident is not critical (e.g., not an imminent danger), but the dispatcher lacks sufficient information to proceed directly to a dispatch protocol 124, the emergency dispatch protocol 108 may shunt to additional inquiries 210 designed to guide the dispatcher to gather information from the person needing assistance to enable the dispatcher to ascertain the chief complaint. If the chief complaint is determined, the emergency dispatch protocol 108 may shunt to the appropriate dispatch protocol 124 for dealing with that chief complaint.

The dispatch protocol 124 may guide the dispatcher through a secondary interrogation focusing on the chief complaint. The dispatch protocol 124 may present a pre-scripted interrogation to enable a more orderly and detailed understanding of the incident that can be communicated to law enforcement emergency responders. The pre-scripted interrogation may include preprogrammed inquiries focused on gathering information relating to the chief complaint. The preprogrammed inquiries provided by the dispatch protocol 124 may be termed "Key Questions" for the particular situation or condition of the chief complaint. The preprogrammed inquiries presented may depend on responses from the person needing assistance. Verifying 206 the criticality of the incident and giving 208 pre-arrival instructions may include traversing the logic tree of the dispatch protocol 124. Dispatch protocols 124, in general, are discussed in greater detail below with reference to FIG. 11.

During the dispatch protocol 124, the dispatcher 104 and/or the emergency dispatch protocol 108 will gather information about the circumstances of the incident or emergency situation, discovered through interrogation, and may dispatch 214 an appropriate emergency dispatch response. The dispatch protocol 124 facilitates uniform and consistent gathering of information relating to the emergency and dispatching 214 of an appropriate emergency dispatch response. The appropriate emergency dispatch response may be determined through a system of assigning determinant values as the protocol progresses (i.e., traverses) through a logic tree. The determinant values, as described above, may range, for example, from E-1 for generally very serious emergencies to $\Omega$-2 for generally less serious emergencies. In another embodiment, the determinant values may range from, for example, E-1 for generally very serious emergencies to A-2 for generally less serious emergencies. In still another embodiment, the determinant values may range differently, such as for example from A-1 for generally very serious emergencies to E-5 for generally less serious emergencies.

After the appropriate emergency dispatch response has been dispatched 214 (e.g., law enforcement officers), the dispatcher may remain in communication with the person needing assistance to provide 216 post-dispatch instructions regarding what to do, and what not to do, prior to the arrival of law enforcement officers. The post-dispatch instructions help to stabilize the situation and expedite the work of law enforcement officers at the scene. Post-dispatch instructions may include, for example, "do not disturb anything at the scene, including weapons, tools, or objects found nearby," "stay on the line and I'll tell you exactly what to do next," and the like. Post-dispatch instructions may also or alternatively include a graphical multimedia message transmitted to a portable electronic device belonging to the person needing assistance, viewable by the person needing assistance to provide him or her with additional, more detailed instructions for specific tasks, remedies, treatments, equipment operation, etc.

Figure 3:
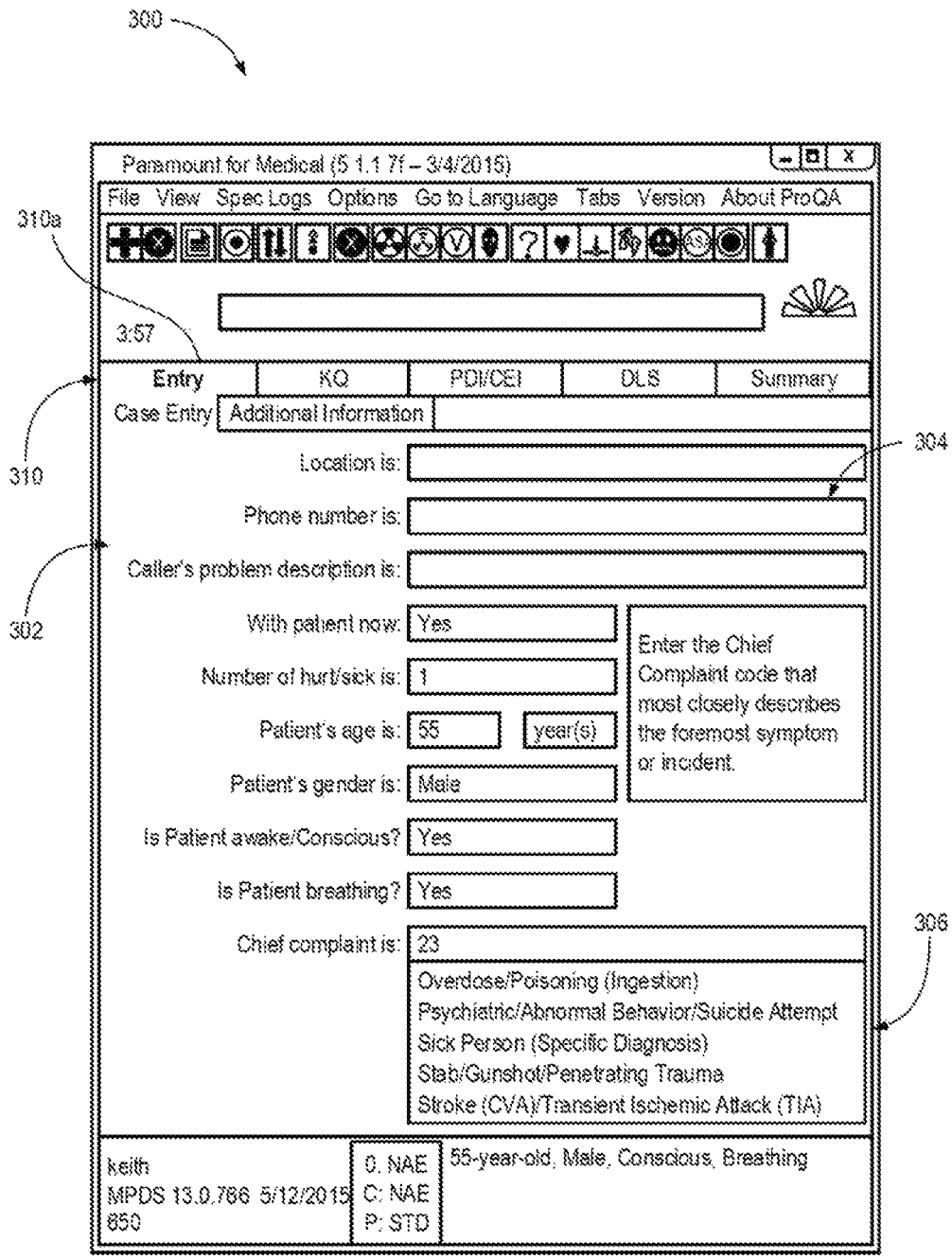
FIG. 3 is a user interface of an emergency dispatch system, according to one embodiment.

FIG. 3 is a user interface 300 of an emergency dispatch system, according to one embodiment. The emergency dispatch system user interface 300 allows a dispatcher to interface with the emergency dispatch protocol. The illustrated user interface 300 is shown traversing the case entry protocol 202 of the emergency dispatch protocol 108 (described above with reference to FIG. 2). The emergency dispatch protocol may present inquiries 302 (or questions) via the emergency dispatch system user interface 300. The inquiries 302 are provided for the dispatcher to relay to the person needing assistance to gather information regarding the reported incident or emergency. The dispatcher and/or the emergency dispatch system may gather the information in the form of responses to the inquiries 302 from the person needing assistance.

The dispatcher may input the responses of the person needing assistance to the inquiries 302 into response fields 304 provided by the user interface 300. The response fields 304 may include, for example, any of a number of appropriate input field types, including but not limited to text fields, text boxes, menus, drop-down menus, drop-down selection boxes, lists, buttons, check boxes, radio buttons and/or hybrid fields. For example, a text field for identifying the problem may allow for freeform input but also provide a list of suggestions to the dispatcher that can be inserted into the text field by clicking and/or double clicking an entry in the list. The response fields 304 may correspond to information indicative of one or more responses to the inquiries 302 from the person needing assistance. In some embodiments, the inquiries 302 may change from an interrogative form to an assertional form after a response has been entered and/or when a cursor is not in the corresponding response field 304.

The responses from the person needing assistance are relayed from the person needing assistance to the dispatcher, for example, over the telephone or via an SMS/MMS message. Information from the responses of the person needing assistance may be input into the system by the dispatcher and may be used by the emergency dispatch protocol to determine subsequent inquiries 302 and instructions to present to the dispatcher. The response information may indicate the person needing assistance's observations of the incident and/or current situation. The emergency dispatch system may use the response information to generate an emergency dispatch response by properly trained law enforcement officers. The information gathered from the responses of the person needing assistance may be used by the determinant value calculator to calculate a determinant value that can be communicated to the emergency responders. Additional details relating to emergency dispatch protocols and user interfaces to interact with the same can be found in the earlier referenced U.S. patents.

The inquiries 302 of the user interface 300 may include a chief complaint inquiry and corresponding responses 306. For example, the chief complaint of the person needing assistance may be drug overdose/poisoning (ingestion). In other embodiments, the chief complaint may be a bee sting, cardiac arrest, stroke, heart attack, gunshot wound, etc., either of the person needing assistance or of some other victim. The responses 306 to the chief complaint inquiry may include relevant preprogrammed responses to be selected by the dispatcher according to the responses given by the person needing assistance. Upon inputting a response 306 to a chief complaint, the user interface 300 may advance to a further screen depicted in FIG. 4 as the emergency dispatch protocol performs its functions within a logic tree. Additional details regarding the chief complaint are discussed below with reference to FIG. 4.

The user interface 300 may further comprise tabs 310 to aid in organizing and/or compartmentalizing various aspects of processing a communication. The tabs 310 may include a tab 310*a* for presenting a case entry protocol portion of an emergency dispatch protocol (e.g., "Entry" tab). Other tabs may include a tab for presenting a dispatch protocol portion of the emergency dispatch protocol (e.g., a "KQ" tab or Key Questions tab), a tab for presenting post-dispatch instructions and/or critical EMD information (e.g., a "PDI/CEI" tab), a tab for dispatching life support (e.g., a "DLS" tab), and a tab summarizing the communication and/or processing of the communication (e.g., "Summary" tab). The KQ tab is discussed below with reference to FIG. 4.

Figure 4:
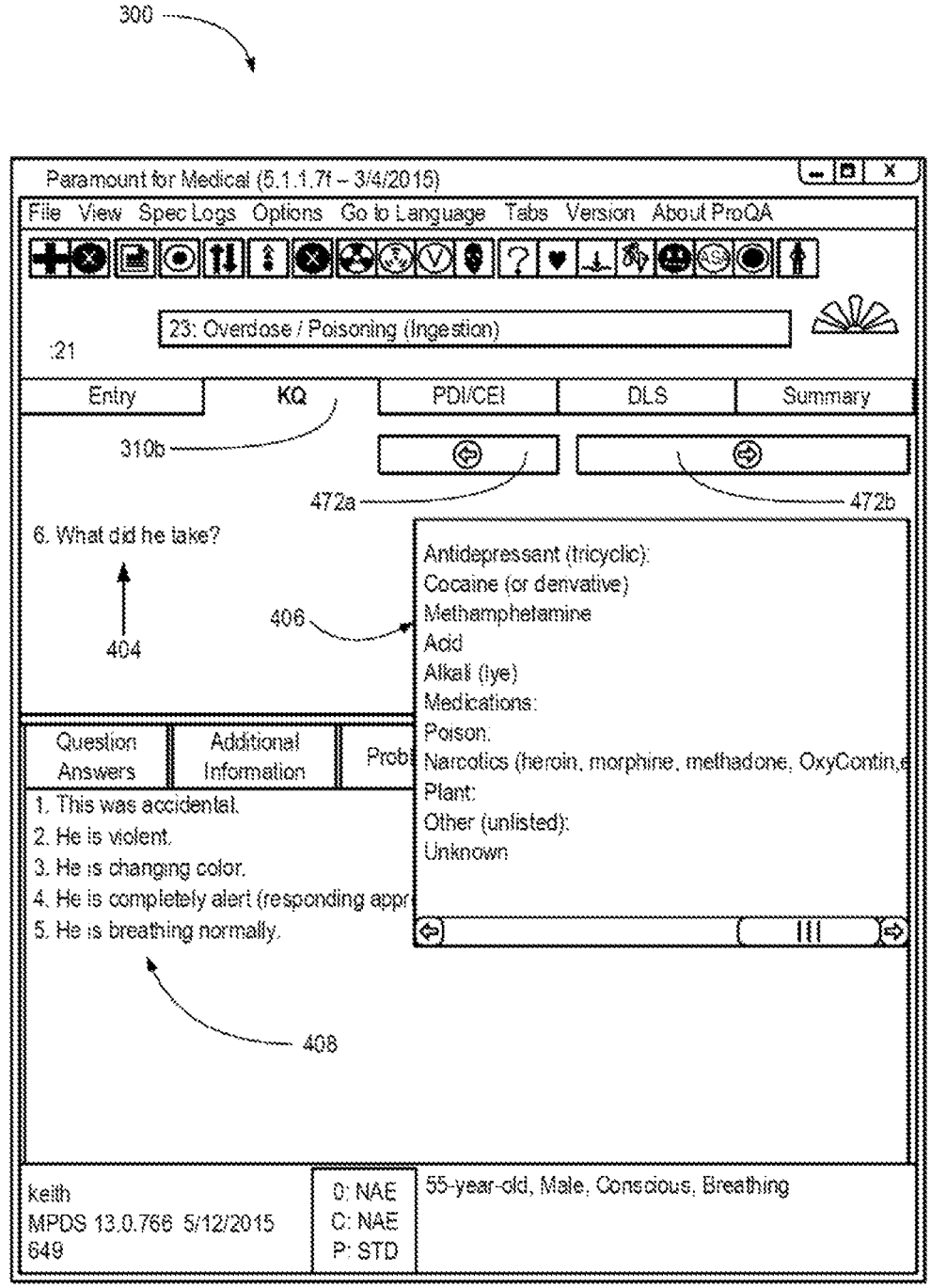
FIG. 4 is a user interface of an emergency dispatch system as it traverses a logic tree for reporting drug overdose according to one embodiment.

FIG. 4 is a user interface 300 of an emergency dispatch system as the emergency dispatch system presents a pre-scripted interrogation, traversing one path of a logic tree of the emergency dispatch protocol 108 (FIG. 1), according to one embodiment. The user interface 300 presents a key question 404 within the KQ (Key Questions) tab 310b in response to a previous input as the emergency dispatch protocol 108 (FIG. 1) traverses the path of a logic tree. The key question 404 may be triggered and presented in response to discovery of the chief complaint or else it may be triggered by any other answer to a preprogrammed inquiry within the emergency dispatch system. As each key question 404 is answered, a new key question 404 may appear, and the response to the previous question may be presented in the answers pane 408 with a summary of the answers to previous preprogrammed inquiries shown in FIG. 3. In some embodiments, only one key question 404 may be asked, while in other embodiments, more than one key question 404 may be asked depending on the circumstances of the situation involving the person needing assistance. The key question 404 may provide greater detail about the chief complaint and may be designed to probe for further insight into the chief complaint to allow the dispatcher to potentially provide further assistance before professional help is dispatched to the scene. Additionally or alternatively, the key question 404 may be provided to ascertain important information relevant to the calculation of determinant values and/or the criticality of the situation as well as the decision of what sort of professional help should be dispatched.

For example, as shown in FIG. 4 where the illustrated chief complaint is a drug overdose, the key question 404 may be a follow-up inquiry which asks, "What did he take?" for the dispatcher to relay to the person needing assistance. The user interface 300 may provide an input field 406 to respond to preprogrammed inquiry 404. The input field 406 enables the dispatcher to quickly and easily enter input indicative of the person needing assistance's response to the key question 404. In the illustrated embodiment, the input field 406 provided is a list box presenting a list of acceptable inputs. As will be appreciated, the input field 406 may be any of a number of appropriate input field types, including but not limited to text fields, text boxes, menus, drop-down menus, drop-down selection boxes, lists, buttons, check boxes, and radio buttons. In FIG. 4, the list of acceptable inputs may include but are not limited to: antidepressant, cocaine (or derivative), methamphetamine, acid, alkali (lye), medications, poison, narcotics (heroin, morphine, methadone, OxyContin, etc.), plant, other, unknown, etc. Should the appropriate response be unavailable, the input field 406 may allow for the dispatcher to freely input the appropriate response in a text box or by some other freeform input method. For other chief complaints such as a cardiac arrest or a bee sting, the key question 404 and the corresponding input field 406 may be different in form and/or content so as to provide the necessary detail for the dispatcher and/or the emergency dispatch system to relay to the emergency responders.

The user interface 300 as depicted in FIG. 4 may also present the answers pane 408 to display input received in relation to previous instructions and/or preprogrammed inquiries. For example, the answers pane 408 of FIG. 4 displays the dispatcher-entered input provided for multiple previously presented preprogrammed inquiries and/or instructions presented by the dispatch protocol 124, e.g., "1. This was accidental. 2. He is violent . . . . 5. He is breathing normally." The answers pane 408 enables a dispatcher to quickly review previous responses for accuracy and to thereby improve understanding of the situation and/or incident reported by the person needing assistance. As shown, the answers pane 408 displays each response to previous questions in order up to the current key question 404 being asked. If the dispatcher were to inadvertently select an incorrect input in the input field 406, the dispatcher can readily recognize the error in the answers pane 408 and navigate back in the protocol by selecting the back navigation button 472a and then select a correct input.

The user interface 300 presents one or more tabs 310, including the tab 310b (e.g., a Key Questions or "KQ" tab) that is configured to present preprogrammed inquiries (e.g., key questions) as part of a pre-scripted interrogation of a dispatch protocol. The particular questions presented may depend on the dispatch protocol and the path along a logic tree of the emergency dispatch protocol 108 (FIG. 1) that may be traversed based on responses from the person needing assistance to the preprogrammed inquiries. Typically, but not always, the user interface 300 will present the tab 310b (e.g., a Key Questions or "KQ" tab) upon completion of the case entry protocol on tab 310a (i.e., the "Entry" tab). If sufficient information is available to identify a chief complaint, the emergency dispatch protocol may shunt to an appropriate dispatch protocol, present tab 310b, initialize the appropriate dispatch protocol, and traverse the appropriate dispatch protocol.

The user interface 300 may present navigation buttons 472a, 472b to enable the dispatcher to indicate to the user interface 300 to navigate back or forward, respectively, in the emergency dispatch protocol. The dispatcher can select the forward navigation button 472b to indicate to the user interface 300 that the dispatcher is ready to proceed in the protocol. The dispatcher can select the back navigation button 472a to go back in the protocol. Accordingly, when the dispatcher selects the forward navigation button 472b, the protocol advances and the user interface 300 may present a next instruction and/or a preprogrammed inquiry.

Figure 5:
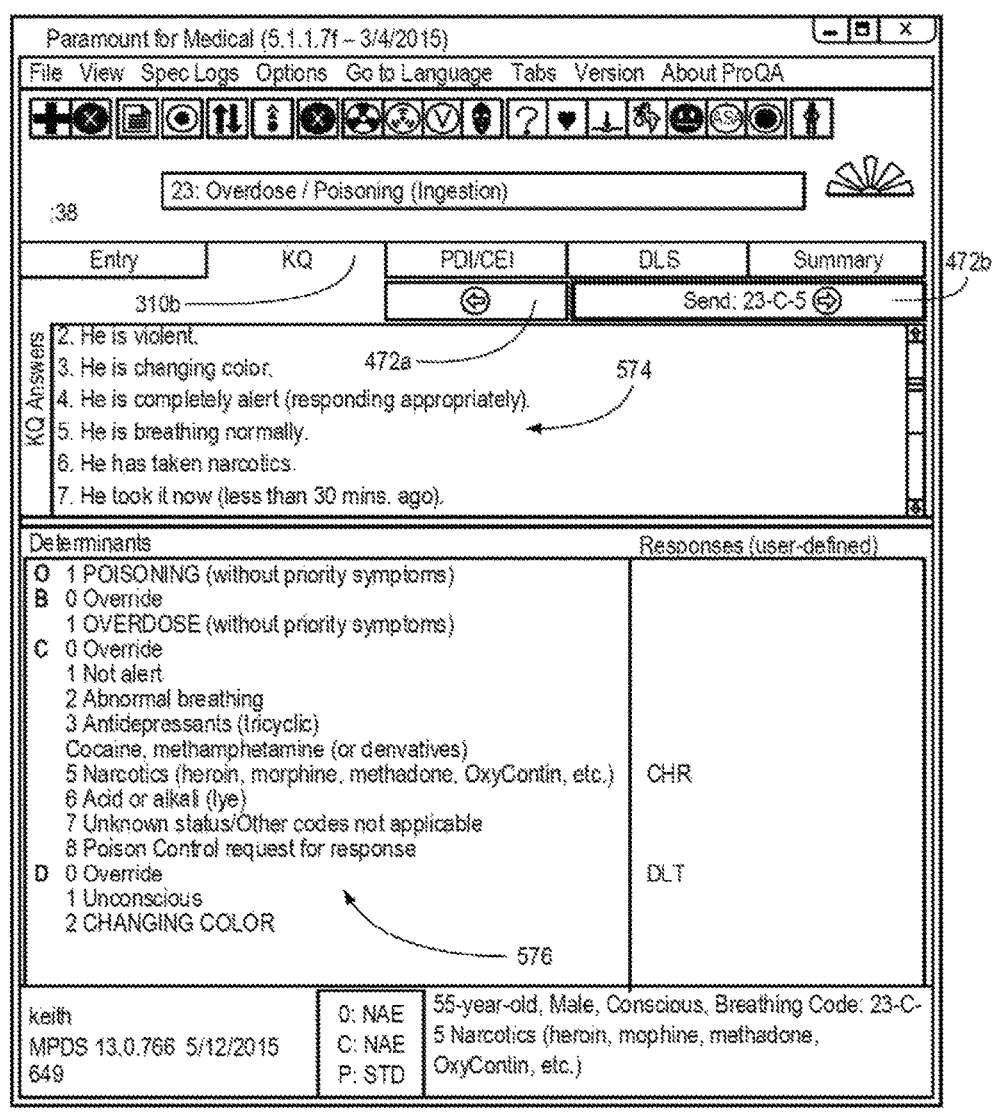
FIG. 5 is a user interface of an emergency dispatch system as it further traverses a logic tree for reporting drug overdose according to one embodiment.

FIG. 5 is a user interface 300 of an emergency dispatch system as the emergency dispatch system presents a pre-scripted interrogation, further traversing one path of a logic tree of the emergency dispatch protocol 108 (FIG. 1), according to one embodiment. As previously explained above, with reference to FIG. 3, the emergency dispatch system user interface 300 allows a dispatcher to interface with the emergency dispatch protocol. FIG. 5 shows one embodiment of the user interface 300 displaying a tab 310b (i.e., a Key Questions or "KQ" tab) upon completion of the case entry protocol on tab 310a (i.e., the "Entry" tab). Within tab 310b, an answers pane 574 may be presented similar to that shown in 408 of FIG. 4 with reference to the KQ answers input by the dispatcher. The answers pane 574 may represent responses to the key questions 404 (FIG. 4) entered by the dispatcher according to the responses given by the person needing assistance. The answers within answers pane 574 may be used by the dispatcher to provide an easy summary of the interrogation with the person needing assistance, thereby enabling fast access of any previously obtained information. The answers pane 574 may also be provided to give context for a list of determinants 576 presented within the user interface 300 and calculated using the responses input by the dispatcher. In some embodiments, the emergency dispatch system may automatically highlight one or more of the determinants 576 that are deemed most relevant to the given situation according to the dispatch protocol 124. In some embodiments, the determinant value calculator 110 (FIG. 1) may use the input responses to calculate the determinants 576 that are most relevant. The user interface 300 may then display the relevant determinants 576. The determinants 576 displayed may be a subset of all possible determinants preprogrammed into the emergency dispatch system, and by traversing one or more paths of a logic tree, the determinant value calculator may provide only determinants 576 relevant to the situation of the person needing assistance based on the responses to preprogrammed inquiries. For example, in some embodiments, the determinants 576 displayed in the user interface 300 may relate to a case of drug overdose (e.g., POISONING (without priority symptoms), Override, OVERDOSE (without priority symptoms), Override, Not alert, Abnormal breathing, etc.). In other embodiments, the list of determinants 576 may relate to other emergency situations such as a bee sting, a cardiac arrest, a stroke, a car accident, etc.

The list of determinants 576 may be used by the dispatcher to determine a determinant value (e.g., O-1, C-3, etc.) to assign to a given situation, as discussed in FIG. 1. In some embodiments, the determinant value calculator 110 (FIG. 1) uses the determinants 576 to automatically calculate and assign a determinant value. As shown in FIG. 5, possible determinant values for the situation portrayed may be O-1: POISONING (without priority symptoms), C-2: Abnormal breathing, or D-1: Unconscious. In other embodiments, the determinants 576 may relate to a case of cardiac arrest, a bee sting, a heart attack, etc., and the determinant values calculated therefrom may use different characters and/or numbers. Further discussion on the determination of determinant values is in FIGS. 1 and 11.

Figure 6:
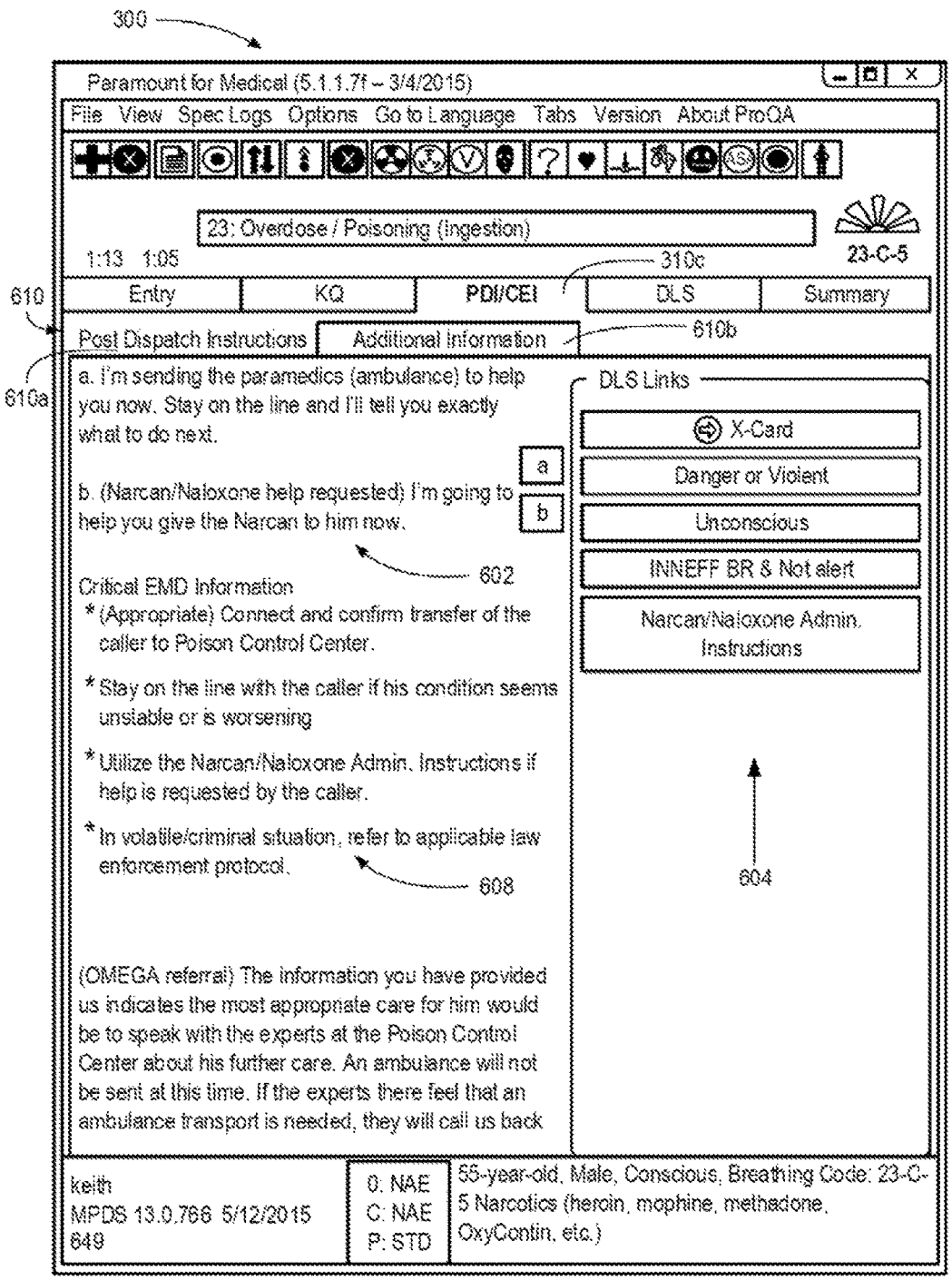
FIG. 6 is a user interface of an emergency dispatch system, displaying post-dispatch instructions for the dispatcher to provide further assistance for treating a drug overdose according to one embodiment.

FIG. 6 is a user interface 300 of an emergency dispatch system as the emergency dispatch system presents post-dispatch instructions for the dispatcher to relay to the person needing assistance, according to one embodiment. As shown in FIG. 6, the user interface 300 displays additional information and options within a tab 310c for presenting post-dispatch instructions and/or critical EMD information (PDI/CEI). Another layer of tabs 610, within viewing window of tab 310c, may give the dispatcher the option of viewing either post-dispatch instructions 602 or additional information (not shown) upon selecting either tab 610a or 610b, respectively. DLS links 604 are provided in the user interface 300 and are selectable by the dispatcher to advance the user interface 300 to display a tab for dispatching life support (i.e., "DLS" tab), which may contain instructions corresponding to the prompts recited on the DLS links 604. For example, as shown in FIG. 6, the DLS links 604 may include "Danger or Violent," "Unconscious," "Narcan/Naloxone Admin. Instructions," etc., and upon selection by the dispatcher may advance the emergency dispatch system within a logic tree of the emergency dispatch protocol 108 (FIG. 1) to display further instructions related to the selected DLS link 604.

Post-dispatch instructions 602 as displayed in FIG. 6 are for relaying to the person needing assistance and may involve additional direction to the person needing assistance regarding his or her chief complaint or other response to previously answered preprogrammed inquiries. As discussed above, post-dispatch instructions are relayed by the dispatcher to the person needing assistance after the appropriate response team (e.g., police, firemen, animal control, etc.) has been dispatched. In some embodiments, the post-dispatch instructions 602 may provide vital instructions to the person needing assistance in the case of an emergency. In other embodiments, the post-dispatch instructions 602 may be a pre-scripted dialogue to carry on with the person needing assistance to provide moral support or serve the purpose of keeping the person needing assistance occupied until the appropriate emergency response team arrives on scene. For example, as shown in FIG. 6 where the chief complaint was drug overdose, the dispatcher may be prompted by the post-dispatch instructions 602 to relay specific messages to the person needing assistance, such as, "I'm sending the paramedics (ambulance) to help you now. Stay on the line and I'll tell you exactly what to do next," or "(Narcan/Naloxone help requested) I'm going to help you give the Narcan to him now." In other situations, such as the case of bee stings or cardiac arrest, the post-dispatch instructions 602 may include prompts for the dispatcher to guide the person needing assistance through the use of allergy medication or a defibrillator. Instructions for administering the Narcan, allergy medication, or defibrillator are discussed in greater detail in FIGS. 7-10. Further information not meant to be relayed to the person needing assistance may also be displayed with tab 610a for the dispatcher's benefit to provide greater insight and/or direction on how to interact with the person needing assistance in a given situation. For example, critical EMD information 608 may be displayed for the dispatcher such as: "Connect and confirm transfer of the caller to Poison Control Center," or "Stay on the line with the caller if his condition seems unstable or worsening." Such information that is not intended to be relayed to the person needing assistance may be labeled with a heading (e.g., "Critical EMD Information") and/or identified with an asterisk ("*") or other identifier to differentiate from post-dispatch instructions 602 that are intended to be relayed to the person needing assistance.

Additional information (not shown) may be displayed upon selection of tab 610b by the dispatcher. Such additional information may provide the dispatcher with background knowledge and/or context related to the circumstances reported by the person needing assistance. For example, in the case of a drug overdose, the additional information under tab 610b may display definitions of relevant terminology and/or vernacular used in the appropriate determinant value in the case. Such definitions may include, "OVERDOSE: Intentional intake of potentially harmful substance" or "POISONING (Ingestion): Accidental intake of a potentially harmful substance." The additional information may additionally or alternatively include background information to the dispatcher, relevant for further diagnosis of the situation, such as "CHANGING COLOR: Changing colors of clinical significance include: Ashen, Blue, Cyanotic, Gray, Mottled, Purple." This additional information may be used by the dispatcher to ascertain other helpful details relating to a given situation in a post-dispatch setting where the gathering of helpful information may still be important, but not be as time-sensitive as it is before dispatching emergency responders.

Also depicted in FIG. 6 are the DLS links 604 which are selectable by the dispatcher by one or more clicks or else via keyboard instructions. Upon selection, the emergency dispatch system advances along a logic tree of the emergency dispatch protocols 108 (FIG. 1) to display a tab for dispatching life support (i.e., "DLS" tab). More detailed instructions for relaying to the person needing assistance are displayed on the user interface 300 when the dispatcher selects one of the DLS links 604. The detailed instructions are discussed in greater detail in FIGS. 7-10.

Figure 7:
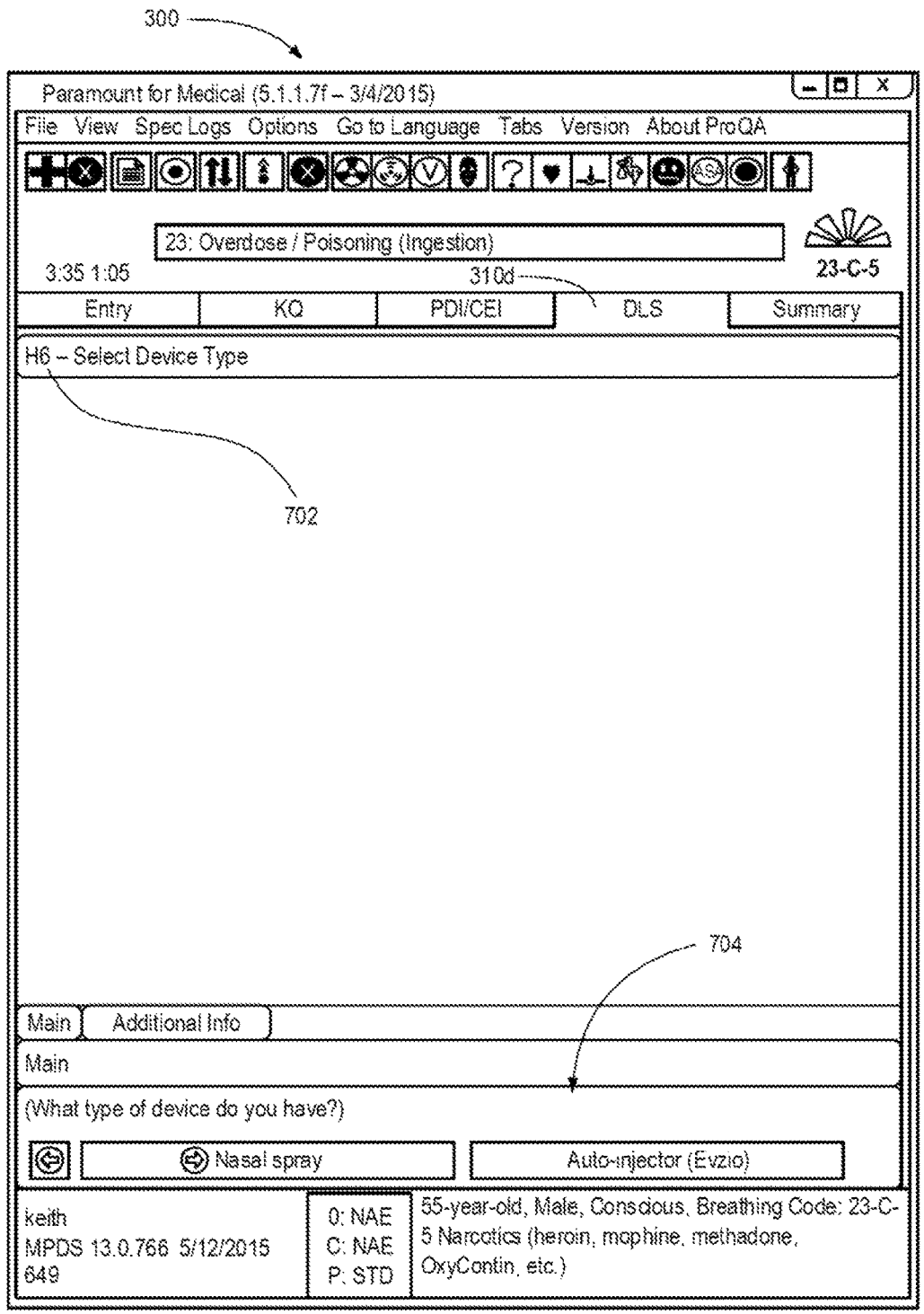
FIG. 7 is a user interface of an emergency dispatch system providing two overdose treatment options ("Nasal spray" and "Auto-injector (Evzio)") for selection according to one embodiment.
Figure 9:
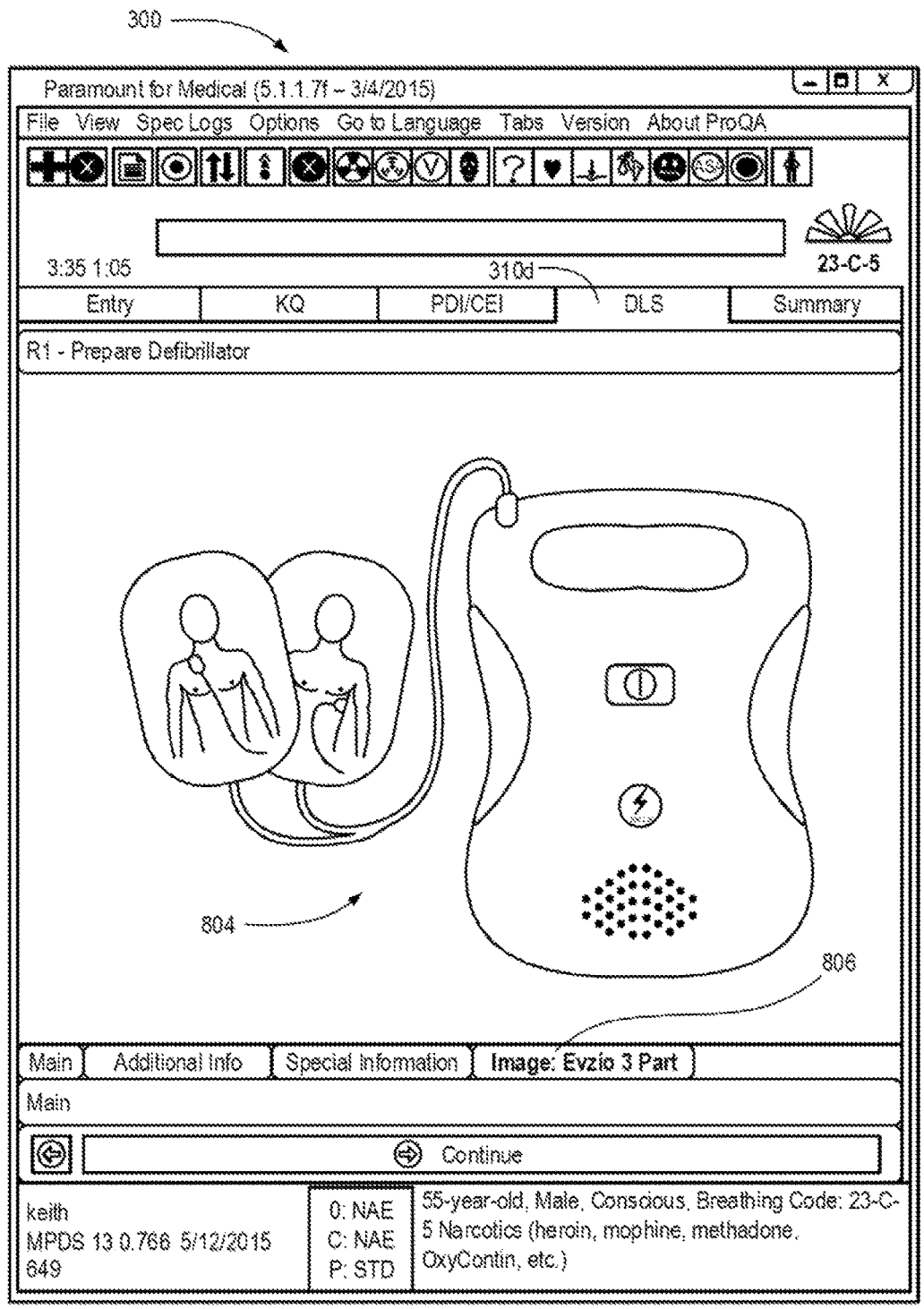
FIG. 9 is a user interface of an emergency dispatch system displaying a transmittable image of an external defibrillator according to one embodiment.
Figure 10:
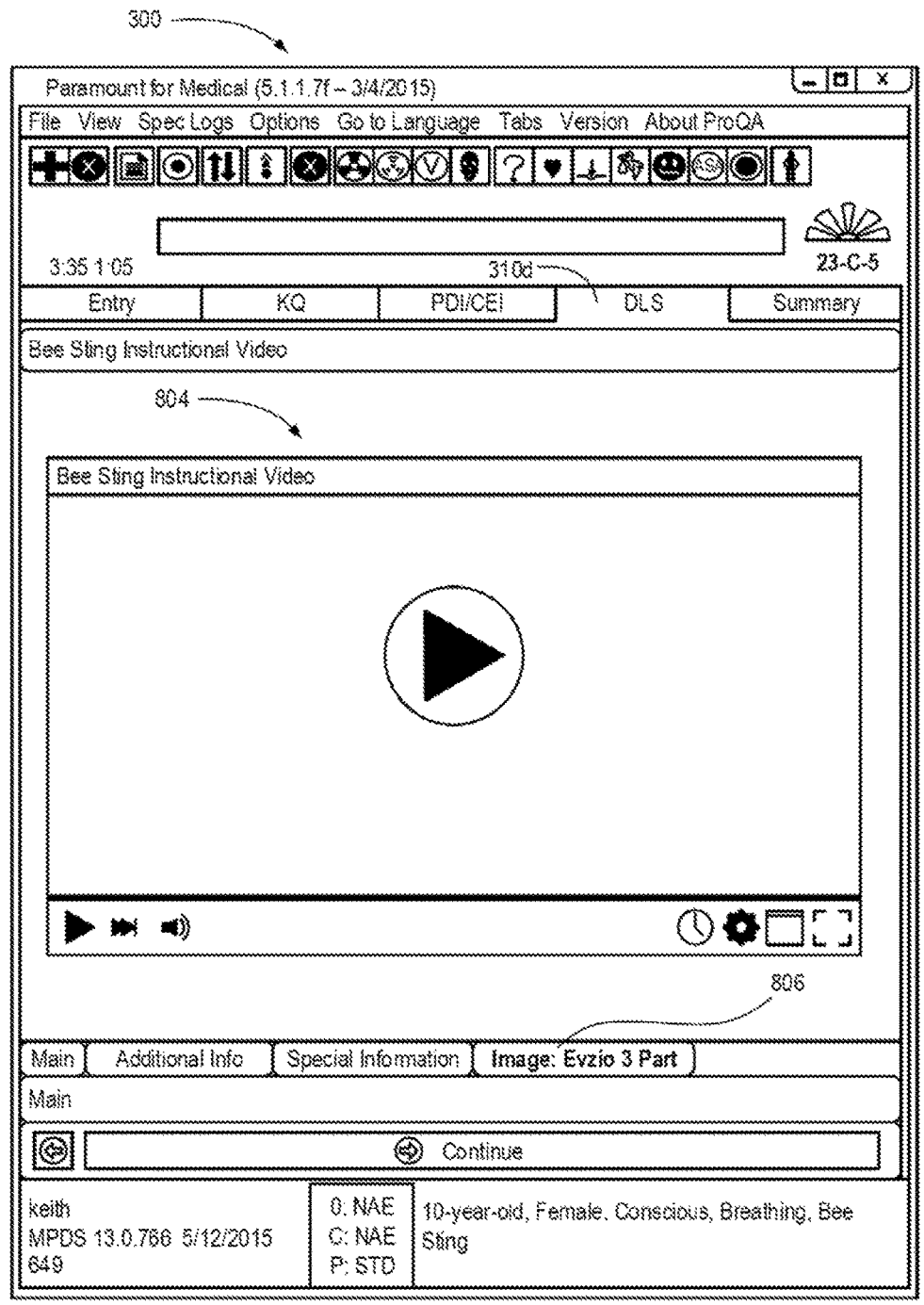
FIG. 10 is a user interface of an emergency dispatch system displaying a transmittable instructional video for treatment of bee stings according to one embodiment.

FIG. 7 is a user interface 300 of an emergency dispatch system as the emergency dispatch system presents treatment instructions to the dispatcher for relaying to the person needing assistance. Once post-dispatch instructions 602 (FIG. 6) have been relayed to the person needing assistance, and the dispatcher has selected one of the DLS links 604 (FIG. 6), emergency dispatch protocol 108 (FIG. 1) may advance through the logic tree to display DLS tab 310*d* within the user interface 300. Within DLS tab 310*d*, prompt 702 may display short instructions to the dispatcher to select a treatment method 704 within a viewing window of user interface 300. For example, as shown in FIG. 6, DLS link 604 "Narcan/Naloxone Admin. Instructions" was selected in relation to a case of drug overdose, which resulted in the user interface 300 displaying the screenshot shown in FIG. 7. The dispatcher may be provided the option to choose one or more of a selection of treatment methods 704, such as "Nasal spray" and "Auto-injector (Evzio)," as shown in FIG. 7. In other embodiments, where the emergency situation may be a bee sting or cardiac arrest, the treatment methods 704 displayed for selection by the dispatcher may include "EpiPen Auto-injector" or "External Defibrillator," respectively. In the same or alternate embodiments, the treatment methods 704 may include still other treatments and may be updatable within the emergency police dispatch system to adapt to changing medications and treatment options. Upon selection of one of the treatment methods 704, the emergency police dispatch system may display transmittable pictorial or video instructions as shown in FIGS. 8-10.

Figure 8:
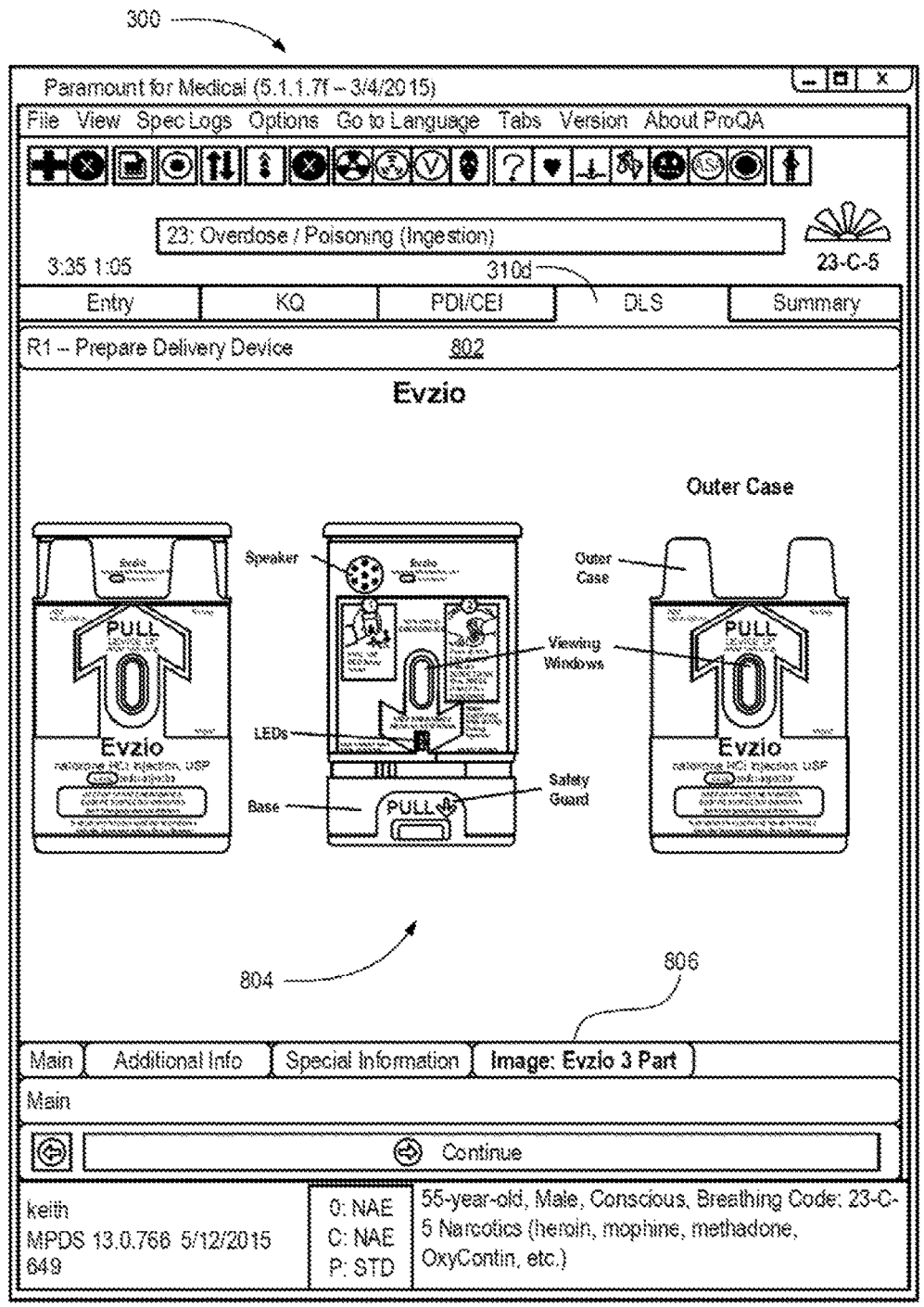
FIG. 8 is a user interface of an emergency dispatch system displaying a transmittable image of an Evzio auto-injector for treatment of drug overdose according to one embodiment.

FIG. 8 is a user interface 300 of an emergency police dispatch system as the emergency police dispatch system presents a transmittable graphical multimedia message 804 containing instructions for a given treatment method 704 (FIG. 7). In some embodiments, the dispatcher may be able to right click the graphical multimedia message 804, and a menu may be displayed which gives the dispatcher the option to send the graphical multimedia message 804 to the person needing assistance via MMS, email, or other means to his or her portable electronic device. In an embodiment, the menu may be displayed only if the dispatcher right clicks on the graphical multimedia message 804 within the user interface 300. In other embodiments, there may not be a menu, and the graphical multimedia message 804 may be sent automatically. In still other embodiments, the graphical multimedia message 804 may be sent in response to the dispatcher clicking a button or performing some other input within the user interface 300. As previously explained above, with reference to FIG. 3, the user interface 300 may provide other input methods to allow the dispatcher to send a graphical multimedia message 804. Also, post-dispatch and/or pre-arrival instructions and/or inquiries and/or instructions from a diagnostic tool 120 (FIG. 1) may be sent via a graphical multimedia message 804 using the user interface 300, for example, by right clicking and selecting an option send the message/instruction in an MMS format, instant message format, email format, or other type of message format.

Within DLS tab 310*d*, instruction prompt 802 may describe what the graphical multimedia message 804 shown in the user interface 300 is provided to do, while a descriptor 806 is also displayed which may describe the specific type, brand, or function of the treatment and/or medication shown. The graphical multimedia message 804 may be transmittable via MMS, SMTP, or any other viable protocol via cellular telephone networks, data networks (e.g., 4G, 4G LTE, 3G, Edge, etc.), Bluetooth, Wi-Fi, or any other wired and/or wireless communications network suitable for transmitting data from the emergency dispatch system to a portable electronic device. Transmitting the graphical multimedia message 804 to the person needing assistance provides an added measure of clarity and effectiveness to the directions given by the dispatcher. A picture is worth a thousand words, after all. Some situations may result in the person needing assistance losing focus easily, not hearing the dispatcher clearly over the phone, or being too panicked to fully understand the direction he or she is given by the dispatcher. Sending a graphical multimedia message 804 to the person needing assistance so he or she can view it on his or her smartphone or other portable electronic device may help minimize the issues of standard verbal communication, thereby enabling the person needing assistance to comprehend the given instructions more easily through visual representation. The dispatcher may communicate more effectively with the person needing assistance and so provide the necessary help in an efficient manner by simply providing him or her with a picture and/or video that explains what to do in a certain situation. This may be done alone or in conjunction with additional verbal instructions over the phone or in addition to written instructions given via text message (in SMS/MMS format, email format, instant message format, or other suitable messaging format). And this may be done before, after, and/or during dispatch of emergency responders.

In some embodiments, the graphical multimedia message 804 may depict a type of medication with various labels and prompts to aid the person needing assistance in understanding how to recognize and administer the medication. For example, as shown in FIG. 8, a drug overdose medication auto-injector, Evzio, is displayed. The transmittable graphical multimedia message 804 for the Evzio is split into three parts for clarity within a single transmittable image. In other embodiments, multiple images may be transmitted from the emergency dispatch system to the person needing assistance. In FIG. 8, the outer case of the Evzio is shown with various labels to assist the person needing assistance in recognizing the Evzio medication initially. Also shown is a front view and a back view of the Evzio auto-injector with its various components (e.g., speaker, LEDs, base, safety guard, viewing windows) labeled. Other images may also be sent to the person needing assistance, such as a representation of how to apply or inject the auto-injector into the victim after locating it.

In alternative embodiments, the graphical multimedia message 804 may relate to chief complaints other than a drug overdose. For example, if the chief complaint of the person needing assistance is a bee sting, graphical multimedia message 804 may be transmitted by the dispatcher via the emergency dispatch system to display a bee sting medication or an emergency allergy medication (e.g., EpiPen auto-injector) in case the victim is allergic. In still other embodiments, the graphical multimedia message 804 may relate to treating a victim of cardiac arrest. In such cases, an external defibrillator is often required to stop arrhythmia and allow the heart to reestablish an effective rhythm. Accordingly, the graphical multimedia message 804 may display an external defibrillator and may provide additional instruction on its application and use. In some embodiments, the graphical multimedia message 804 may help the person needing assistance prevent further harm to the victim, himself or herself, or others until the emergency responders arrive on scene. In other embodiments, the graphical multimedia message 804 may provide the person needing assistance with the information necessary to resolve the situation on his or her own. In still other embodiments, the graphical multimedia message 804 may provide little more than a distraction to occupy the person needing assistance until professional help arrives. Additional or alternative embodiments are described further in FIGS. 9 and 10.

FIG. 9 is an alternative embodiment of a user interface 300 of an emergency dispatch system as the emergency dispatch system presents a transmittable graphical multimedia message 804 for a given treatment method 704 (FIG. 7). In FIG. 9, a graphical multimedia message 804 depicts an external defibrillator. In the case of cardiac arrest, for example, a person needing assistance may have access to a defibrillator but may not have the background knowledge or experience to know how to recognize or use one if the circumstances should require it. By receiving an image of a defibrillator with accompanying labels and instructions, a person needing assistance may easily view the image on his or her portable electronic device, enabling him or her to recognize a defibrillator and have at least a rudimentary understanding of its various components. Furthermore, by viewing the instructional graphical multimedia message 804 sent by the dispatcher, the person needing assistance may be able to more quickly learn how to operate a defibrillator. What would otherwise take a dispatcher far too long to describe and explain verbally can be accomplished much more quickly via visual representation. The graphical multimedia message 804 of the external defibrillator may be transmitted by the dispatcher via the emergency dispatch system to the person needing assistance either manually or automatically.

Additionally, the graphical multimedia message 804 may be received by the person needing assistance on his or her portable electronic device in a viewable format (e.g., .jpg, .png, .gif, .tiff, .bmp, etc.), and receipt of the graphical multimedia message 804 may be confirmed to the emergency dispatch system. In some embodiments, the emergency dispatch system may require a confirmation of receipt of the graphical multimedia message 804 by the person needing assistance. Should the person needing assistance be unable to view the graphical multimedia message 804, the message may be resent in a different format and/or resolution (e.g., 320×240 pixels, 1920×1080 pixels, etc.) until the message is viewable and confirmation of receipt is obtained. The confirmation of receipt may be sent automatically or may be sent manually by the person needing assistance to the dispatcher through verbal communication (i.e., the person needing assistance tells the dispatcher that the message was received and viewable/playable), SMS/MMS message, or other means. Sometimes, the portable electronic device of the person needing assistance may not be compatible with one or more of the possible message formats available for transmitting and receiving the graphical multimedia message 804. In such situations, no confirmation of receipt may be sent to and/or received by the emergency dispatch system. The emergency dispatch system may have an internal timer that may prompt the dispatcher to resend the graphical multimedia message 804 in an alternate format should no confirmation be received in a given time frame. In other embodiments, the graphical multimedia message 804 may be resent automatically by the emergency dispatch system when the timer expires. In still other embodiments, the dispatcher may ask the person needing assistance if the graphical multimedia message 804 was received and viewable/playable on the portable electronic device of the person needing assistance. Upon receiving confirmation from the person needing assistance, the dispatcher may manually confirm receipt of the graphical multimedia 804 message by the person needing assistance.

FIG. 10 is another embodiment of a user interface 300 of an emergency dispatch system as the emergency dispatch system presents a transmittable graphical multimedia message 804 for a given treatment method 704 (FIG. 7). In FIG. 10, the graphical multimedia message 804 displayed is a bee sting treatment video. The video may be transmittable as a graphical multimedia message via MMS or other protocol to the person needing assistance by the methods discussed in FIGS. 8 and 9. The person needing assistance may then be able to play the video on his or her own portable electronic device to watch and/or listen to the instructions presented therein. Confirmation of receipt may be received by the emergency dispatch system if the video is playable. Such confirmation may be achieved automatically or by manual dispatcher input upon verbal communication of receipt and playback by the person needing assistance as discussed above. Should the video be in a format that is incompatible with the portable electronic device of the person needing assistance, the video may be resent in a different format until confirmation of receipt is confirmed and the person needing assistance is able to view the video. More detailed discussion of confirmation of receipt is in the discussion of FIG. 9.

A video such as a bee sting treatment video may provide instruction in even greater detail than an image or a series of images and may help the person needing assistance most effectively. If a picture is worth a thousand words, then a video is worth even more. For example, if a victim is allergic to bee stings, the person needing assistance may not be familiar with severe allergic reactions and how to properly address the situation to help the victim. Likewise, the dispatcher may be similarly ignorant and otherwise unable to provide assistance over the phone. Through the pre-scripted interrogation provided by the emergency dispatch system, the dispatcher may be able to provide the appropriate guidance by sending a video to the person needing assistance which depicts proper application of, for example, an EpiPen auto-injector. In other embodiments, video instructions of drug overdose medication, external defibrillators, and various other medications and treatments are contemplated.

The transmittable video may be recorded and preprogrammed into the emergency dispatch system and may be transmitted to the person needing assistance either manually or automatically. In other embodiments, the video may be a live feed from a camera of the dispatcher or a camera of emergency response personnel who can provide assistance to the person needing assistance. In the same or alternate embodiments, the video may be in any playable format suitable for a portable electronic device, such as: .m4a, .mp4, .mpg, .wmv, .m4v, etc. In some embodiments, the video may be sent at a lower resolution (e.g., 320×240 pixels) for faster transmission while in other embodiments the video may be sent at a higher resolution (e.g., 1920×1080 pixels) for clarity and precision of instruction.

Figure 11:
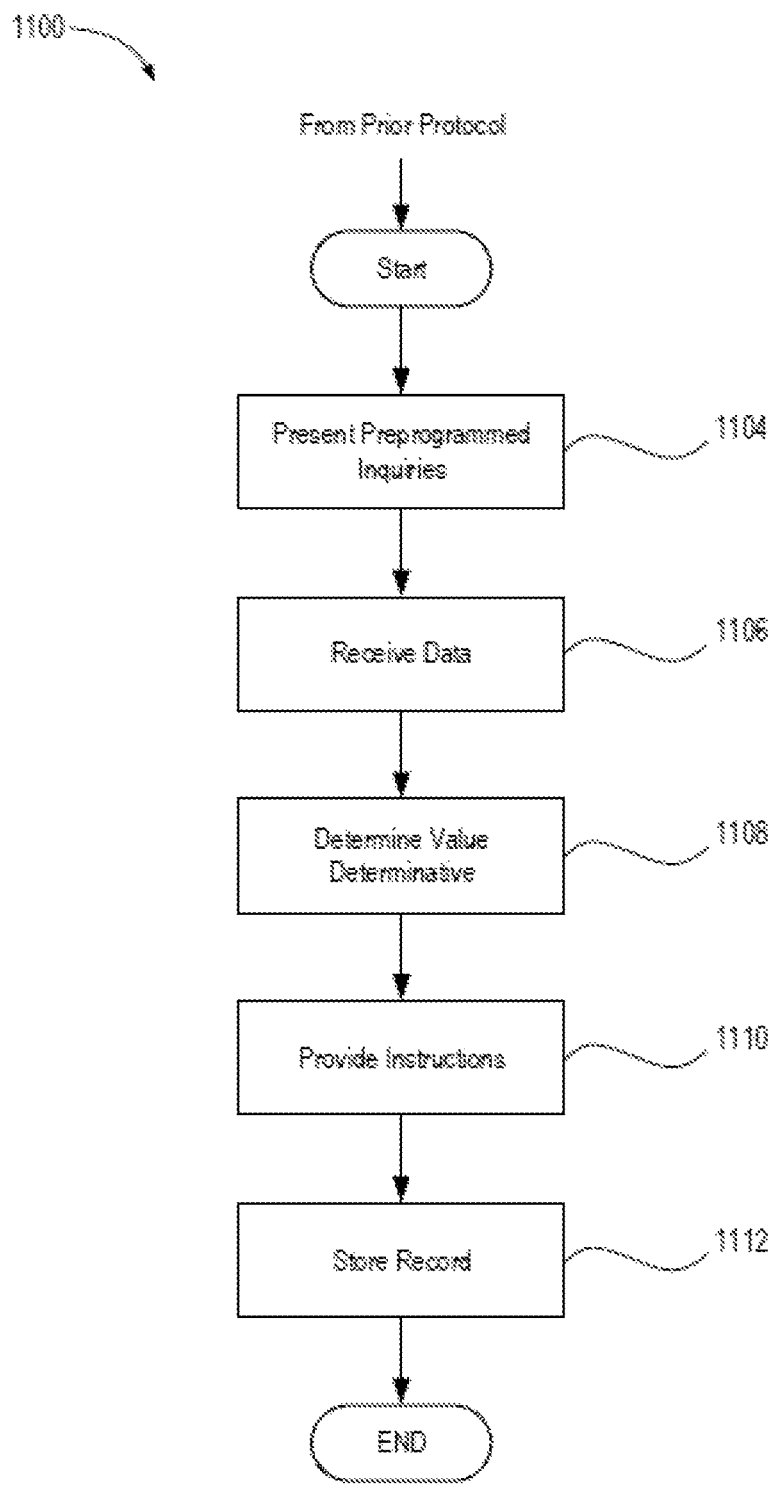
FIG. 11 is a flow diagram implemented by a dispatch protocol according to one embodiment.

FIG. 11 is a high-level flow diagram of a method 1100 implemented by a dispatch protocol 124 (FIG. 1) for an emergency dispatch system, according to one embodiment. The dispatch protocol 124 facilitates uniform and consistent gathering of information relating to the reported chief complaint. Generally, but not always, sub-protocols within the dispatch protocol 124 for responding to specific incidents may initialize from a prior sub-protocol. The prior sub-protocol may be a case entry protocol, which may branch to a sub-protocol appropriate for handling the chief complaint of the communication once all or a portion of the case entry protocol has been traversed. In some instances the prior sub-protocol may be a different sub-protocol, from which a determination was made to shunt to a more appropriate sub-protocol. The determination to shunt may be made automatically by the prior sub-protocol or manually by the dispatcher.

The dispatch protocol 124 may present 1104 preprogrammed inquiries according to a pre-scripted interrogation. The preprogrammed inquiries may also be referred to as "Key Questions," targeted to ascertain the criticality of the incident or situation, and typically are based on the chief complaint. The preprogrammed inquiries may be considered a part of a pre-scripted interrogation that is based on a logic tree of the dispatch protocol 124. The preprogrammed inquiries that are presented as part of a pre-scripted interrogation may depend on dispatcher-entered input. A pre-scripted interrogation may be considered to be a set of preprogrammed inquiries presented according to traversal of a path along the logic tree.

Data is received 1106 from the dispatcher, as relayed from the person needing assistance, following the preprogrammed inquiries asked to the person needing assistance by the dispatcher. The data received 1106 may correspond to responses from the person needing assistance to the preprogrammed inquiries. The data may be used to determine subsequent questions, or to determine instructions to provide to the dispatcher. The data may be received substantially in real-time, as the dispatcher inputs the data. Alternatively, or in addition, the input may be received from the emergency dispatch system 100 because information sought by the dispatch protocol 124 may have previously been obtained from the dispatcher via the case entry protocol and/or another portion of the dispatch protocol 124. Alternatively, or in addition, the input may be received from a diagnostic tool 120. The dispatcher-entered input relates to the emergency communication and/or the reported incident. The dispatcher-entered input may affect the path along which the logic tree is traversed.

The received 1106 data is also used by the protocol to determine 1108 a determinant value and/or update an already determined determinant value. Intermediate determinant values may be produced as information is received and processed, and the final determinant value may be determined after all information is received and processed. The dispatch protocol 124 may provide 1110 appropriate instructions to be relayed to the person needing assistance by the dispatcher. The instructions may comprise post-dispatch instructions for the person needing assistance to help stabilize or otherwise ameliorate a situation and to expedite the work of law enforcement officers at the scene. A database may be accessed to produce appropriate instructions. Records of the communications may be stored 1112 for historical reports, for review and analysis of dispatcher performance, and for continued quality assurance control. A record of a communication may include, but is not limited to, inquiries, responses, and determinant values.

As can be appreciated, some or all of the information gathered by the pre-scripted interrogation may not be used, for example, in calculating a determinant value. Similarly, some or all the information may not be communicated to the emergency responder law enforcement officers. However, the information gathered may be used, or stored for later use, by law enforcement and/or emergency dispatch services, for example, to review the response and/or identify ways to improve the response.

As can also be appreciated, the spelling and/or sentence structure of the preprogrammed inquiries may vary according to the geographic location or region where the emergency dispatch system may be deployed.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A computer-implemented method for guiding a dispatcher when communicating with a caller via a communication device regarding a victim in an emergency incident and for dispatching an emergency dispatch response to the incident, the computer-implemented method comprising:
   presenting, on a dispatch center computer device, a pre-scripted interrogation comprising a plurality of preprogrammed inquiries for the dispatcher to present to the caller in order to systematically obtain a description of the incident, wherein the description of the incident comprises responses by the caller to the plurality of preprogrammed inquiries;
   receiving, on the dispatch center computer device, input representative of the responses by the caller to the preprogrammed inquiries of the pre-scripted interrogation;
   determining automatically on the dispatch center computer device a determinant value from one of a plurality of pre-established determinant values based on the input representative of the responses by the caller to one or more of the plurality of preprogrammed inquiries;
   generating an emergency dispatch response by emergency responders based on the determinant value;
   presenting, on the dispatch center computer device, an inquiry for the dispatcher to present to the caller in order to determine if an emergency medical device is local to the caller;
   displaying, on the dispatch center computer device, the emergency medical device; and
   providing via the dispatch center computer device a graphical multimedia message configured to display the emergency medical device and display preprogrammed expert instructions to operate the emergency medical device local to the caller to immediately treat the victim based on the responses by the caller to one or more of the plurality of preprogrammed inquiries.

2. The computer-implemented method of claim 1, wherein the graphical multimedia message comprises one or more images.

3. The computer-implemented method of claim 1, wherein the graphical multimedia message comprises one or more videos.

4. The computer-implemented method of claim 1, wherein presenting the pre-scripted interrogation further comprises the dispatch center computer device traversing a path of a logic tree as the pre-scripted interrogation progresses, the logic tree configured to determine the preprogrammed inquiries to present as part of the pre-scripted interrogation based on caller responses to the preprogrammed inquiries.

5. The computer-implemented method of claim 1, further comprising providing preprogrammed inquiries to the dispatcher via a user interface on an output device of the dispatch center computer device.

6. The computer-implemented method of claim 1, wherein the dispatch center computer device is further configured to automatically select a preprogrammed answer based on the input representative of the responses by the caller, wherein the preprogrammed answer comprises a sent graphical multimedia message to the caller.

7. The computer-implemented method of claim 6, further comprising receiving confirmation of receipt of the automatically selected preprogrammed answer from the dispatcher.

8. The computer-implemented method of claim 1, wherein the dispatch center computer device transmits the graphical multimedia message to the caller in response to a dispatcher input.

9. The computer-implemented method of claim 1, further comprising storing time stamps and contents for all graphical multimedia messages sent by the dispatch center computer device.

10. The computer-implemented method of claim 1, further comprising determining a computer network address for the caller based on a telephone number of the caller.

11. The computer implemented method of claim 1, wherein the medical device is an auto-injector.

12. The computer implemented method of claim 1, wherein the medical device is a nasal spray.

13. The computer implemented method of claim 1, wherein the medical device is an external defibrillator.

14. A computer system to guide a dispatcher when communicating with a caller via a communication device regarding a victim in an emergency incident, the computer system comprising:
    a processor;
    an output device in communication with the processor;
    an input device in communication with the processor;
    a communication interface in communication with the processor; and
    a memory in communication with the processor, the memory comprising:
        a protocol comprising a logic tree that is configured to determine one of a plurality of pre-established determinant values, the protocol configured to:
            present on the output device a pre-scripted interrogation comprising a plurality of preprogrammed inquiries for the dispatcher to present to the caller in order to systematically obtain a description of the incident, wherein the description of the incident comprises responses from the caller to the plurality of preprogrammed inquiries;
            receive, via at least one of the input device and the communication interface, input representative of the responses by the caller to the preprogrammed inquiries of the pre-scripted interrogation;
            determine automatically, using the processor, a determinant value from one of the plurality of pre-established determinant values based on the input representative of the responses by the caller to one or more of the plurality of preprogrammed inquiries, wherein the determinant value specifies an appropriate emergency dispatch response;
            present, on the output device, an inquiry for the dispatcher to present to the caller in order to determine if an emergency medical device is local to the caller;
            display, on the output device, the emergency medical device; and
            provide, via at least one of the input device, the output device, and the communication interface, a graphical multimedia message configured to display the emergency medical device and display preprogrammed expert instructions to operate the emergency medical device local to the caller to immediately treat the victim based on the responses by the caller to one or more of the plurality of preprogrammed inquiries.

15. The computer system of claim 14, wherein the graphical multimedia message comprises one or more images.

16. The computer system of claim 14, wherein the graphical multimedia message comprises one or more videos.

17. The computer system of claim 14, wherein the protocol is further configured to automatically select a preprogrammed answer based on the input representative of the responses by the caller, wherein the preprogrammed answer comprises a sent graphical multimedia message to the caller.

18. The computer system of claim 17, wherein the protocol is further configured to receive confirmation of the automatically selected preprogrammed answer from the dispatcher.

19. The computer system of claim 14, wherein the communication interface sends the graphical multimedia message to the caller in response to a dispatcher input.

20. The computer system of claim 19, wherein the dispatcher input comprises a selection of a preprogrammed inquiry to be sent to the caller.

21. The computer system of claim 19, wherein the dispatcher input comprises not more than two actions.

22. The computer system of claim 14, wherein the protocol is further configured to store time stamps and contents for all graphical multimedia messages sent by the communication interface.

23. The computer system of claim 14, wherein the medical device is an auto-injector.

24. The computer system of claim 14, wherein the medical device is a nasal spray.

25. The computer system of claim 14, wherein the medical device is an external defibrillator.

26. A non-transitory computer-readable storage medium having stored thereon computer-readable instruction code for a dispatch center computer device to perform a method for assisting a dispatcher when communicating with a caller via a communication device regarding a victim in an emergency incident, the method comprising:
    presenting on the dispatch center computer device a pre-scripted interrogation comprising a plurality of preprogrammed inquiries for the dispatcher to present to the caller in order to systematically obtain a description of the incident, the description of the incident comprising responses by the caller to the plurality of preprogrammed inquiries, wherein the dispatch center computer device includes a logic tree configured to determine the preprogrammed inquiries of the pre-scripted interrogation and automatically determine one of a plurality of pre-established determinant values based on input representative of the responses by the caller to one or more of the plurality of preprogrammed inquiries;
    receiving input representative of the responses by the caller to the preprogrammed inquiries of the pre-scripted interrogation at the dispatch center computer device;
    assigning on the dispatch center computer device the pre-established determinant value determined by the logic tree and the pre-scripted interrogation;
    generating an emergency dispatch response based on the assigned pre-established determinant value;

presenting, on the dispatch center computer device, an inquiry for the dispatcher to present to the caller in order to determine if an emergency medical device is local to the caller;

displaying, on the dispatch center computer device, the emergency medical device; and providing via the dispatch center computer device a graphical multimedia message configured to display the emergency medical device and display preprogrammed expert instructions to operate the emergency medical device local to the caller to immediately treat the victim based on the responses by the caller to one or more of the plurality of preprogrammed inquiries.

27. The non-transitory computer-readable storage medium of claim 26, wherein the medical device is an auto-injector.

28. The non-transitory computer-readable storage medium of claim 26, wherein the medical device is a nasal spray.

29. The non-transitory computer-readable storage medium of claim 26, wherein the medical device is an external defibrillator.

* * * * *